(12) United States Patent
Powers et al.

(10) Patent No.: US 11,451,577 B2
(45) Date of Patent: Sep. 20, 2022

(54) SYSTEM AND METHOD FOR IMPROVING TRAINING PROGRAM EFFICIENCY

(71) Applicant: Architecture Technology Corporation, Minneapolis, MN (US)

(72) Inventors: Judson Powers, Ithaca, NY (US); Matthew Donovan, Trumansburg, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 16/996,148

(22) Filed: Aug. 18, 2020

(65) Prior Publication Data

US 2020/0382548 A1    Dec. 3, 2020

Related U.S. Application Data

(63) Continuation of application No. 15/699,884, filed on Sep. 8, 2017, now Pat. No. 10,757,132.

(51) Int. Cl.
*G09B 9/00* (2006.01)
*H04L 9/40* (2022.01)
*G06Q 10/06* (2012.01)

(52) U.S. Cl.
CPC ... *H04L 63/1441* (2013.01); *G06Q 10/06398* (2013.01); *G09B 9/003* (2013.01); *H04L 63/1416* (2013.01)

(58) Field of Classification Search
CPC . G09B 5/00; G09B 7/00; G09B 19/00; G06Q 10/06398
See application file for complete search history.

(56) References Cited

U.S. PATENT DOCUMENTS

| 8,468,004 B2* | 6/2013 | Battaglia | G09B 23/30 703/12 |
| 8,996,342 B1* | 3/2015 | Brennan | G06F 30/23 703/7 |
| 2002/0062242 A1* | 5/2002 | Suzuki | G06Q 10/10 705/7.42 |
| 2003/0187723 A1* | 10/2003 | Hadden | G09B 7/00 705/7.42 |
| 2004/0148216 A1* | 7/2004 | Waddington | G06Q 10/06398 705/7.37 |
| 2006/0224434 A1* | 10/2006 | Rumi | G06Q 10/0633 705/7.27 |

(Continued)

*Primary Examiner* — Peter R Egloff
(74) *Attorney, Agent, or Firm* — Key IP Law Group, PLLC

(57) ABSTRACT

A method for improving efficiency of a training program begins with a processor monitoring and adapting execution of a training exercise of the training program. The processor determines a training program effectiveness measure including determining trainee skill improvement demonstrated during the training exercise, and monitoring and determining correctness and timeliness of trainee actions during the training exercise. The processor then determines a training program cost measure by determining a first monetary cost for the execution of the at least one training exercise, determining a second monetary cost associated with trainee manhours for the training exercise, and generating the training program cost measure based on the first and second monetary costs. The processor then computes a ratio of the training program effectiveness measure to the training program cost measure.

21 Claims, 24 Drawing Sheets

(56) References Cited

U.S. PATENT DOCUMENTS

2008/0021769 A1* 1/2008 Higgins .................. G09B 7/02
705/7.24
2009/0208910 A1* 8/2009 Brueckner ......... G09B 19/0053
434/11

* cited by examiner

SYSTEM AND METHOD FOR IMPROVING TRAINING PROGRAM EFFICIENCY

RELATED APPLICATIONS

This application is a continuation of U.S. patent application Ser. No. 15/699,884, filed Sep. 8, 2017 and entitled "System and Method for Evaluating and optimizing Training Effectiveness," the disclosure of which is incorporated by reference.

BACKGROUND

Training programs may be developed and applied to build skills in trainees. The success of these training programs in terms of skill building may depend in part on the fidelity of the training programs and the effectiveness with which the training programs are applied. For example, a cause and effect relationship may exist between a training program's effectiveness and its fidelity. Understating this relationship may be important, particularly when high-fidelity training programs are costly, in terms of time and money, to develop and apply than low-fidelity training programs.

A training program may include a training scenario that is applied to a trainee through a training exercise. The training program may include real-time feedback mechanisms and/or post-exercise feedback mechanisms.

Some training programs are designed for, and implemented on, one or more computing platforms. The computing platforms may be connected through a computing network. Some of these computer-based training programs are designed for individual trainees; other computer-based training programs are designed for multiple trainees. In some training programs designed for multiple trainees, one or more trainees may be pitted against each other. In some computer-based training programs, a trainee may interact only with a computer program. Some training programs may be designed to execute on specialized hardware devices. A flight simulator is an example of such specialized hardware. Flight simulators, and their embedded training programs, may be designed to maintain or improve pilot proficiency, and may be particularly useful for training pilots in certain emergency scenarios without exposing pilots and their aircraft to risk.

Other training programs, which may be ad hoc, specifically are targeted at a large group of trainees with vastly differing skill levels and job descriptions. An iconic example is the large-scale maneuvers executed by elements of the U.S. Army in Texas and Louisiana in the run-up to U.S. entry into World War II.

Many training programs include mechanisms or provisions for evaluating training program effectiveness as measured through training exercises undertaken by individual trainees (i.e. evaluating individual trainee performance), and as measured through training exercises undertaken by trainee groups (i.e., evaluating performance of the group as well as individual trainees or subsets of the trainee group). One such mechanism may be a test administered to the trainee(s) at the conclusion of a training exercise (i.e., immediately thereafter or at a later time).

Some training programs include mechanisms that evaluate the effectiveness of the training program itself. One such mechanism may be a critique completed by individual trainees.

Another aspect of training programs is efficiency. Training program efficiency may be measured in terms of an increase in proficiency of the trainee and in terms of the cost to develop and execute the training program.

Current training programs do not include mechanisms that allow systematic training program evaluation considering the interaction of training effectiveness, fidelity, and efficiency.

SUMMARY

An integrated adaptive learning system provides the functions of scenario development, exercise execution, exercise monitoring, exercise evaluation, exercise adaptation, and scenario feedback, which may be implemented in one or more of a scenario builder module, an exercise test module, an exercise controller module, an exercise performance monitor module, an exercise evaluation module, an exercise adaption module, and an exercise reporting and scenario feedback module. The modules, and other components of the integrated adaptive learning system may be implemented as a standalone physical training system, a training overlay to an existing physical system, and a virtual training system, or combinations thereof. In an aspect, the integrated adaptive learning system may be implemented as a physical or a virtual variable-fidelity cyber range.

A non-transitory, computer-readable storage medium includes a program of instructions for evaluating and optimizing training effectiveness, wherein a processor executes the instructions to receive a selection of one or more challenges to apply to a virtual network generate events, their indications and their timing, to produce time-based event injections; generate a variable-fidelity scenario for applying the challenges to the virtual network using the time-based event injections includes generating fidelity adaptation points in the variable-fidelity scenario at which fidelity of the variable-fidelity scenario may be adapted; create a variable-fidelity training exercise from the variable-fidelity scenario, and store the variable-fidelity training exercise and the variable-fidelity scenario; and execute and evaluate the variable-fidelity training exercise.

A method for improving efficiency of a training program, the training program executed as one or more training exercises, a training exercise following a variable-fidelity training scenario includes a processor monitoring and controlling execution of the training exercise and determining a training program effectiveness measure, which includes the processor determining a level of performance of the trainee and determining trainee skill improvement demonstrated during execution of the training exercise, which in turn includes determining a correctness and a timeliness of trainee actions during the training exercise; adapting a training exercise fidelity during the training exercise; identifying and valuing trainee behaviors during the training exercise; and determining trainee skill improvement as a weighted sum of the trainee actions, fidelity adaptations, and trainee behaviors. Next, the processor determines a training program cost measure, which includes determining a first monetary cost for the execution of the at least one training exercise, determining trainee manhours for the execution of the at least one training exercise and converting the trainee manhours to a second monetary cost, and generating the training program cost measure based on the first and second monetary costs. The processor then determines a ratio of the training program effectiveness measure to the training program cost measure exceeds a threshold value; and identifies training exercise modifications that improve the training program efficiency.

A method for improving efficiency of a training program begins with a processor monitoring and adapting execution of a training exercise of the training program. The processor determines a training program effectiveness measure including determining trainee skill improvement demonstrated during the training exercise, and monitoring and determining correctness and timeliness of trainee actions during the training exercise. The processor then determines a training program cost measure by determining a first monetary cost for the execution of the at least one training exercise, determining a second monetary cost associated with trainee manhours for the training exercise, and generating the training program cost measure based on the first and second monetary costs. The processor then computes a ratio of the training program effectiveness measure to the training program cost measure.

DESCRIPTION OF THE DRAWINGS

The detailed description refers to the following figures in which like numerals refer to like objects, and in which.

DETAILED DESCRIPTION

Figure 1A:
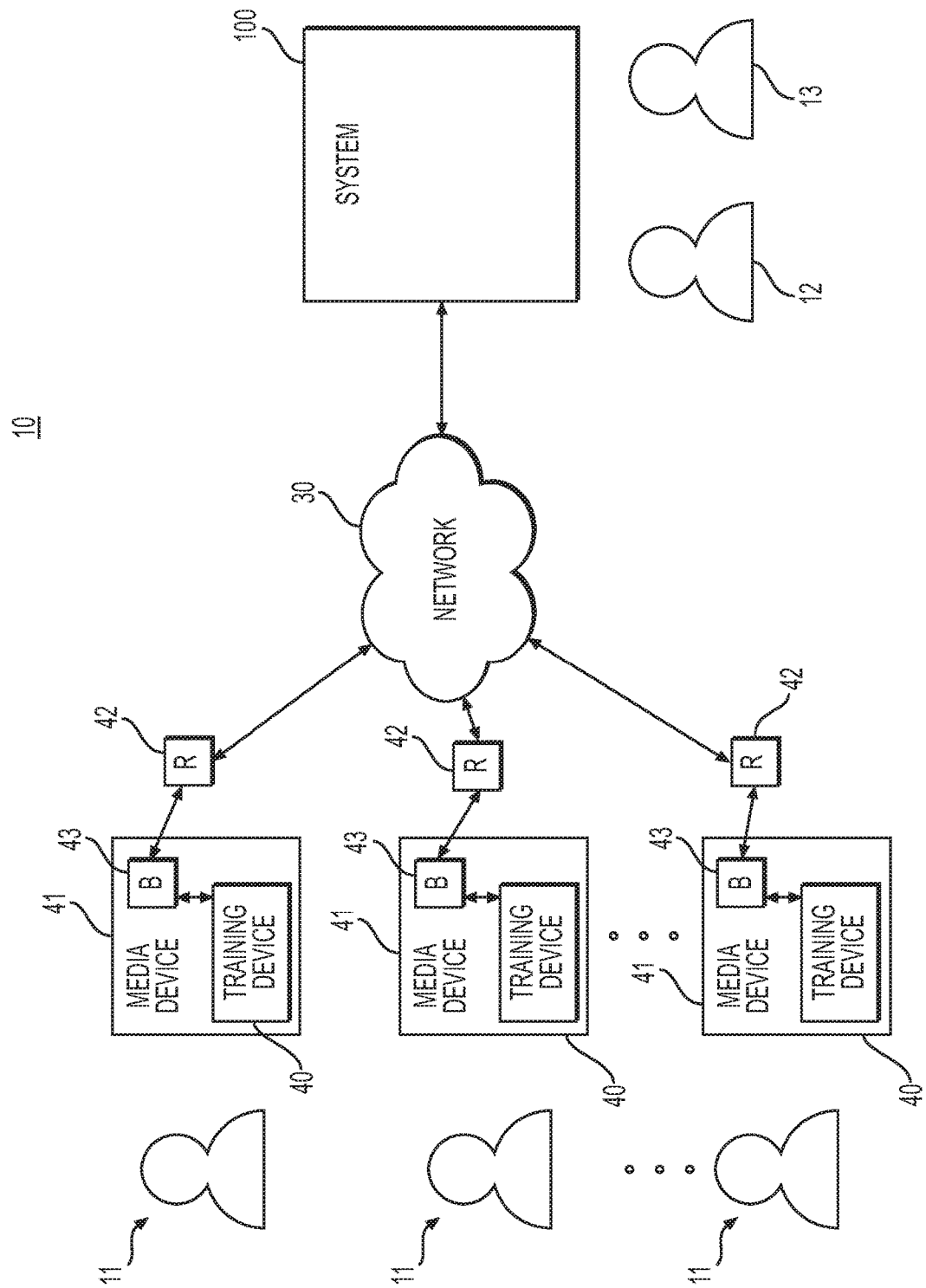
FIGS. 1A and 1B illustrates training environments in which the herein disclosed system and method for evaluating and optimizing training effectiveness may operate.

Many organizations and entities employ training programs to maintain and/or improve the proficiency, skills, knowledge, and performance of individual members and/or groups of members. Such organizations and entities include school systems, businesses, government agencies, including military organizations, non-government organizations (NGOs), and other entities. Training programs developed and applied by or for these organizations and entities in an empirical, scientific sense, may be improved when the training program development and its application takes into account a relationship between a training scenario's fidelity and its effectiveness. Accounting for this relationship may be important because high-fidelity training programs may be more costly (i.e., expensive and time-consuming) to develop and apply than may be low-fidelity training programs. For example, a full-fidelity computer network defense training scenario may be nearly impossible to create, and a high-fidelity field training exercise can be very expensive, time-consuming, and logistically inconvenient to execute.

For consistency of description and ease of description, this disclosure refers generally to the following terms and their definitions. However, these terms and their definitions are not intended to be limiting, and similar terms and their definitions are encompassed by the disclosure.

Trainee typically is a human. A trainee may be an individual or a member of a trainee group.

Training effectiveness is a measure of the increase or maintenance of proficiency, skill, knowledge, or performance (referred to hereafter simply as skill) of an individual trainee or trainee group. Training effectiveness may be expressed as a percentage increase in skill. Training effectiveness may be measured by a post-exercise test (immediately thereafter or/and at some later time), for example. Training effectiveness also may be measured during the course of a training exercise.

Training efficiency may be a measure of the cost of developing a training program or a training scenario. Training efficiency also may be a measure of the cost of applying and evaluating a training program or training scenario. Cost may be measured in terms of time and money. Training efficiency may be expressed as a ratio of training effectiveness and cost.

Training exercise is a specific application of a training scenario or training program.

Training fidelity is a measure of the realism of a training scenario or training exercise in relation to a corresponding, actual action, evolution, or process.

Training program generally is a compilation of training scenarios.

Training scenario generally is a simulation of an actual action, evolution, or process.

One current assumption about training fidelity is that a higher-fidelity training scenario will produce more effective training. This assumption has many weaknesses. First, while the training effectiveness of a high-fidelity training scenario may be higher than the training effectiveness of a low-fidelity training scenario, the training efficiency—effectiveness per unit cost—may be lower. Costs may include, for example, costs to apply a training scenario, such as trainee time, and costs to develop a scenario. If a high-fidelity training exercise takes one hour and produces a 20% skill improvement, a low-fidelity training exercise takes a half hour and produces a 15% improvement, and the same low-fidelity training exercise performed twice (taking one hour) produces a 25% improvement, the low-fidelity training exercise empirically is more efficient. This effect may be particularly pronounced for some types of cost. In particular, if the limiting factor is scenario development cost, improving fidelity may become prohibitively expensive beyond a certain point. Second, it may not even be the case that high-fidelity training exercises are more effective. This can certainly be the case in the realm of physical exercise. For example, endurance aerobic performance, such as long-distance running or cycling, can be improved by endurance exercises, but some aspects of endurance performance are improved much more effectively by high-intensity exercise (e.g., sprint or tempo intervals) rather than slower, longer running or cycling. This is because improving aerobic capacity substantially benefits endurance exercise, but aerobic capacity (but not muscular endurance) is much more effectively increased by high-intensity exercise. Similarly, proficiency with a skill may be more effectively trained using a training exercise that is related to but not the same as simply practicing the skill (which would be a high-fidelity exercise). Third, training effectiveness, or skill improvement, as facilitated through training exercises, may be very different for two apparently similar trainees. That is, a first trainee may experience an expected improvement in skill while a second trainee may experience little or no skill improvement. This divergence in training effectiveness may be particularly pronounced for rigidly designed and applied training scenarios. Fourth, measuring skill improvement (training effectiveness) during or after execution of a training exercise is fraught with inaccuracy, and each skill to be tested may require very different measurement methodologies for accurate results. An improperly designed test or evaluation protocol may lead to erroneous conclusions regarding training scenario effectiveness.

One problem with current training program development and application is that no systematic, empirical model exists relating a training scenario's design to its effectiveness at teaching or improving a skill. As a result, a training scenario developer lacks guidance as to how much fidelity is needed to teach or improve a specific skill. This lack of knowledge results, undoubtedly, in a less-efficient training program design, which results in training that not only likely is less effective than possible, but also more expensive to develop and apply. The herein disclosed system, and corresponding method, for evaluating and optimizing training effectiveness addresses these and other weaknesses with current training program development efforts. By addressing these weaknesses, the system and method optimize training programs for effectiveness, resulting in faster and less expensive training.

To optimize training program and training scenario effectiveness, the herein disclosed system provides a first mechanism for determining the training scenario effectiveness for one or more levels of training scenario fidelity. The system provides a second mechanism for analyzing a training scenario with a particular fidelity level, judges the training effectiveness of that training scenario, and provides guidance to the training scenario developer that enables the developer to determine one or more desired levels of fidelity.

A second problem with current training program development and application relates to accurately measuring training effectiveness. As noted herein, training effectiveness may be defined as the measured improvement level in a targeted skill produced in a trainee through application of a training scenario. There are practical limitations that prevent this definition from being a useful metric. Accurately measuring proficiency with a skill may be difficult, as standardized tests demonstrate. Often, simply the act of measuring proficiency (e.g., with a test) can provide training stimulus. Effectiveness of a training exercise and accuracy of a corresponding training scenario proficiency test can vary widely from person to person. Finally, performing a standard test-train-retest cycle can be time-consuming and expensive. For many training exercises; a training scenario proficiency test may be similar in complexity to a high-fidelity training scenario, which, as discussed earlier, can be costly to develop and apply.

The herein disclosed system, and corresponding method, for evaluating and optimizing training effectiveness addresses the difficulty in accurately measuring training scenario effectiveness though use of a training impact model, which is a proxy measurement that correlates well with training effectiveness but is more practical (and accurate) to measure. In an example, the training impact of a training exercise is a numerical score that may be computed from easily-measurable observables, such as aspects of the trainee's behavior, aspects of a trainee's actions, and other conditions.

A training impact model enables a training scenario developer to assess, with a single test of only the training scenario in question, the level of skill improvement that may be expected from that training scenario. Further, this enables software, given a base level information about the training impact of other scenarios within the field, to assist the training scenario developer in finding the optimal design of the training scenario, including fidelity. This model may be applied using an instrumented training platform.

To develop a training impact model, the training platform may be invoked to host and conduct many training scenarios with similar goals but different levels of fidelity and to streamline the process of conducting experimental training exercises using these training scenarios. The platform also is capable of gathering and recording data about the training exercise, both detailed exercise progress metrics and external data, including trainee behavioral and sensory data. These data enable the construction of a training impact model that uses the measurable data to estimate training effectiveness. Furthermore, to apply the training impact model, the training platform may host and conduct training exercises, gather the impact metrics, and use the impact score (compared to the impact scores of related training scenarios) to provide guidance to the training scenario developer as to whether the training scenario is effective.

The herein disclosed system for evaluating and optimizing training effectiveness may be implemented as an integrated, adaptive training system in many different environments. For example, the system may be implemented on a centralized server system accessible to trainees using local media devices (e.g., laptop computers) on which may be instantiated components of the system. The system further may be implemented in total in a dedicated training facility such as a cyber range. Still further, the system may be implemented in a virtual training environment in which trainees access virtual machines. In an aspect, the virtual training environment may be implemented as a virtual cyber range. The system is integrated in that the system provides training scenario development, training exercise execution, training exercise performance monitoring and evaluation, and training exercise adaptation. The system is adaptive in that the training scenarios and exercises adapt to the training needs and especially the training performance of trainees. In an aspect, the training exercises adapt automatically based, for example, on trainee performance, and dynamically; i.e., in real time during execution of the training exercise.

FIG. 1A illustrates an environment in which the herein disclosed system for evaluating and optimizing training effectiveness operates. In FIG. 1A, environment 10 may be applied to any number of training or learning situations, including to train workers or students, implement new technologies or technological improvements to a workforce, train personnel using simulations rather than using actual, real-world operations, and to provide for group and team training. Environment 10 includes multiple trainees 11, each trainee 11 having access to a training device 40. The environment 10 may include communications network 30, to which the training devices 40 are connected. Finally, the environment 10 may include integrated, adaptive training system 100, which includes mechanisms used by scenario developer 13 to develop training scenarios and by observer/instructor 12 to apply the training scenarios as training exercises.

The training device 40, in an example, may be, or may be implemented on, a media device 41 that connects through communications connector 42 (which may be, for example, a router) to resources on network 30. The trainee 11 operates the training device 40 to communicate with other training devices 40 and with the system 100. The media devices 41 may be fixed or mobile. For example, media device 41 may be an Internet connected "smart" television (iTV); a "basic" or "smart" television connected to a set top box (STB) or other Internet-enabled device; a Blu-ray™ player; a game box; and a radio, for example. Media device 41 also may be a tablet, a smartphone, a lap top computer, or a desk top computer, for example. The media devices 41 may include browsers, such as browser 43. The browser 43 may be a software application for retrieving, presenting, and traversing resources such as at a Web site. A resource may be identified by a Uniform Resource Locator (URL) and may be a Web page, image, video, or other content. The URL may allow the browser 43 to connect to a Web site. Hyperlinks present in resources enable the trainee 11 to navigate the browser 43 to related resources. The trainee 11 may operate the browser 43 to search for Web sites related to specific topics or to search for a specific Web site by URL. The trainee 11 may cause the media device 41 to execute the training devices 40.

Communications network 30 may be any communications network that allows the transmission of signals, media, messages, voice, and data among the entities shown in FIG. 1A, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 30 includes the Internet, cellular systems, and other current and future mechanisms for transmission of these and other media. The network 30 may be both wired and wireless. The network 30 may be all or a portion of an enterprise or secured network. In an example, the network 30 may be a virtual private network (VPN) between the trainee 11 and the training device 40 operated by the trainee 11 across a wireline or a wireless link. While illustrated as a single or continuous network, the network 30 may be divided logically into various sub-nets or virtual networks, so long as a portion of the network 30 may facilitate communications among the entities of FIG. 1A.

In an example, the training devices shown in FIG. 1A include various modules and components that are used in the training process. However, a configuration of a training device may depend on how the training device is to be used in a specific training environment. For example, in the environment of FIG. 1A, a training device may take the form of a "fully-featured" training device, meaning the training device includes components and modules that execute on the host media device 41 to provide monitoring, evaluation, and adaptation functions. Alternately, a training device may be a "thin" training device, meaning the training device includes enough components and modules to communicate with other remotely-located components of the system 100 and to enable monitoring functions by other remotely-located components of the system 100 that are involved in the monitoring process. In a specific thin training device application, the system 100 may be largely located "in the cloud," and trainees 11 may access the system 100 using thin training devices.

Figure 1B:
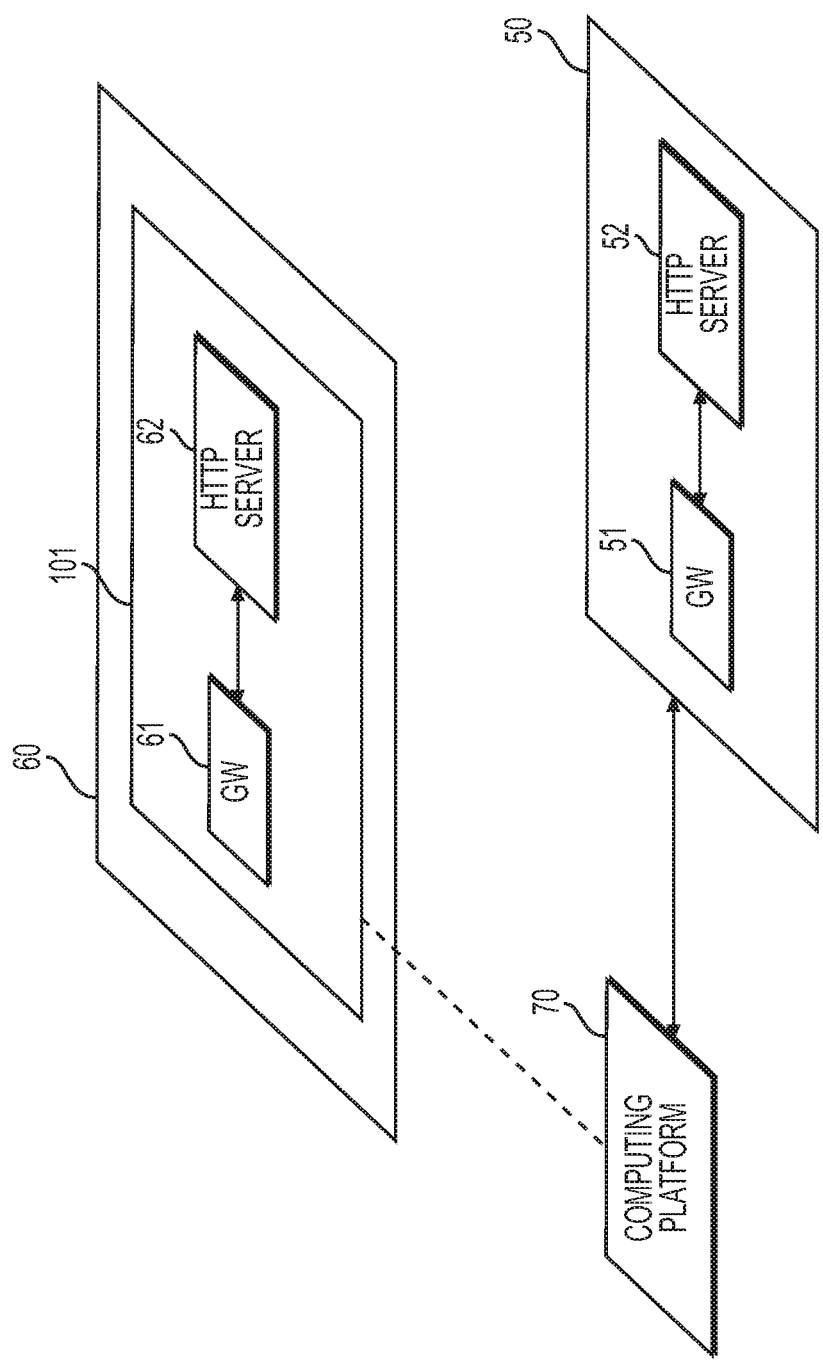

FIG. 1B illustrates another environment in which an example system for evaluating and optimizing training effectiveness may operate. In FIG. 1B, the environment includes physical network 50, which in turn includes gateway 51 and HTTP server 52. The physical network 50 supports overlay network 60 that exists as an overlay to a physical network 50. The physical network 50 is an existing network and the overlay network 60 mirrors the physical network 50. The overlay network 60 may use aspects, devices, and structures that mirror corresponding aspects, devices, and structures of the physical network 50 such as virtual gateway 61 and virtual HTTP server 62. The overlay network 60 further includes integrated, adaptive training system 101, which may operate in some respects in the manner of system 100 of FIG. 1A, and may be instantiated on physical computing platform 70.

Figure 2A:
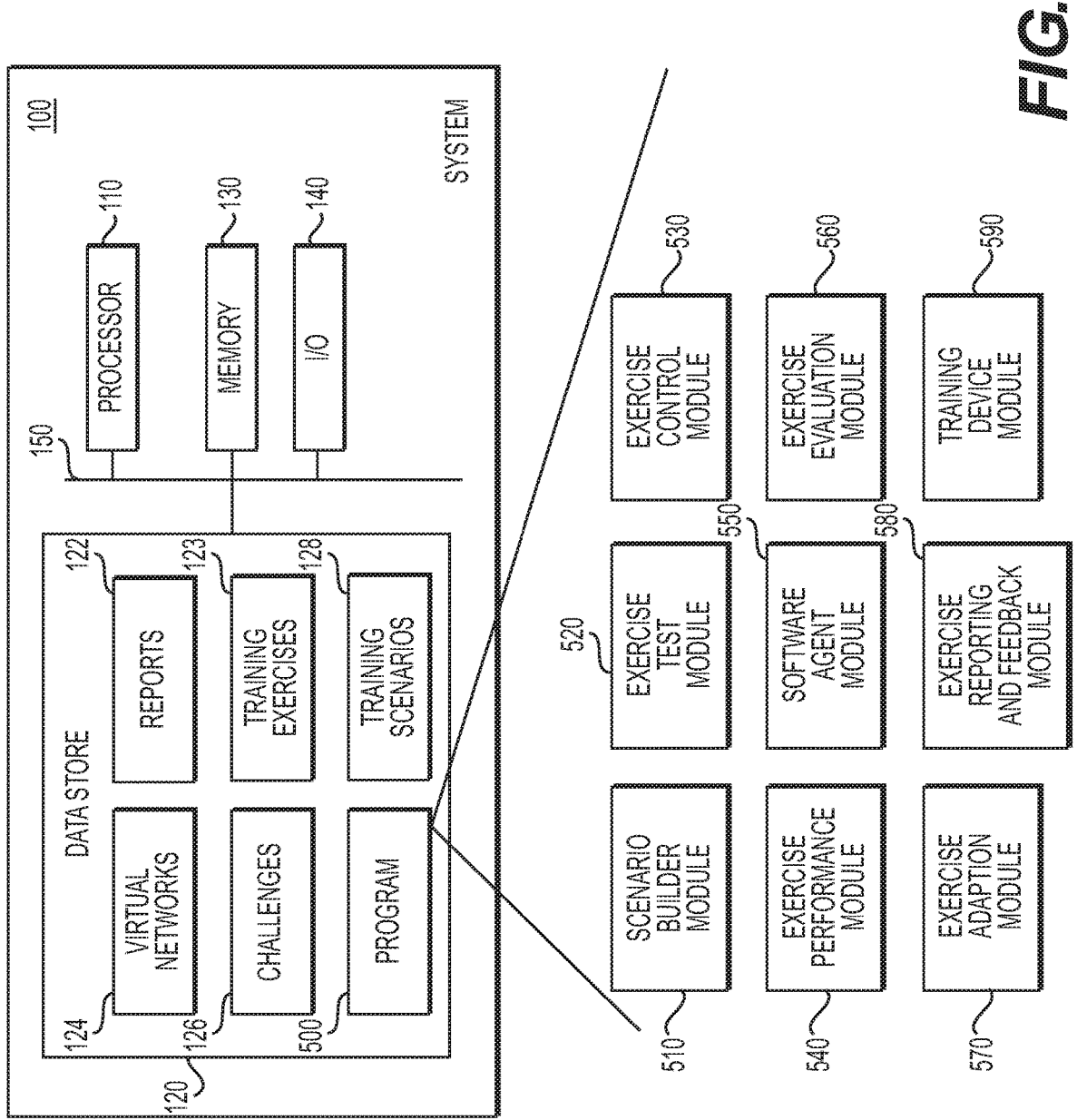
FIGS. 2A-2C illustrate an example system for evaluating and optimizing training effectiveness, and components thereof.

FIG. 2A illustrates a general application of the integrated, adaptive training system 100 used for evaluating and optimizing training effectiveness. In FIG. 2A, system 100 includes the training devices 40, which may be downloaded and installed at media devices 41 of FIG. 1A. The system 100 may include fully-featured training devices 40F and thin training devices 40T. The system 100 further includes central processor station 110, data store 120, memory 130, input/output 140, and communications bus 150. The data store 120 is, or may include, a non-transitory, computer-readable storage medium. The data store 120 may store integrated, adaptive learning program 500. The data store 120 may further include reports database 122, training exercise database 123, virtual network database 124, challenges database 126, and training scenario database 128. The central processor station 110 may access the data store 120, load the program 500 into memory 130, and execute the program 500. The program 500 may include a number of modules, including scenario builder module 510, exercise test module 520, exercise control module 530, performance monitor module 540, exercise evaluation module 560, exercise adaptation module 570, and reporting and feedback module 580. The program 500 also may include training device module 590, which in turn includes the training devices 40F and 40T. Finally, the program 500 includes agent module 550. These modules are described in more detail herein, including with respect to FIGS. 2B and 5A-5G.

Figure 2B:
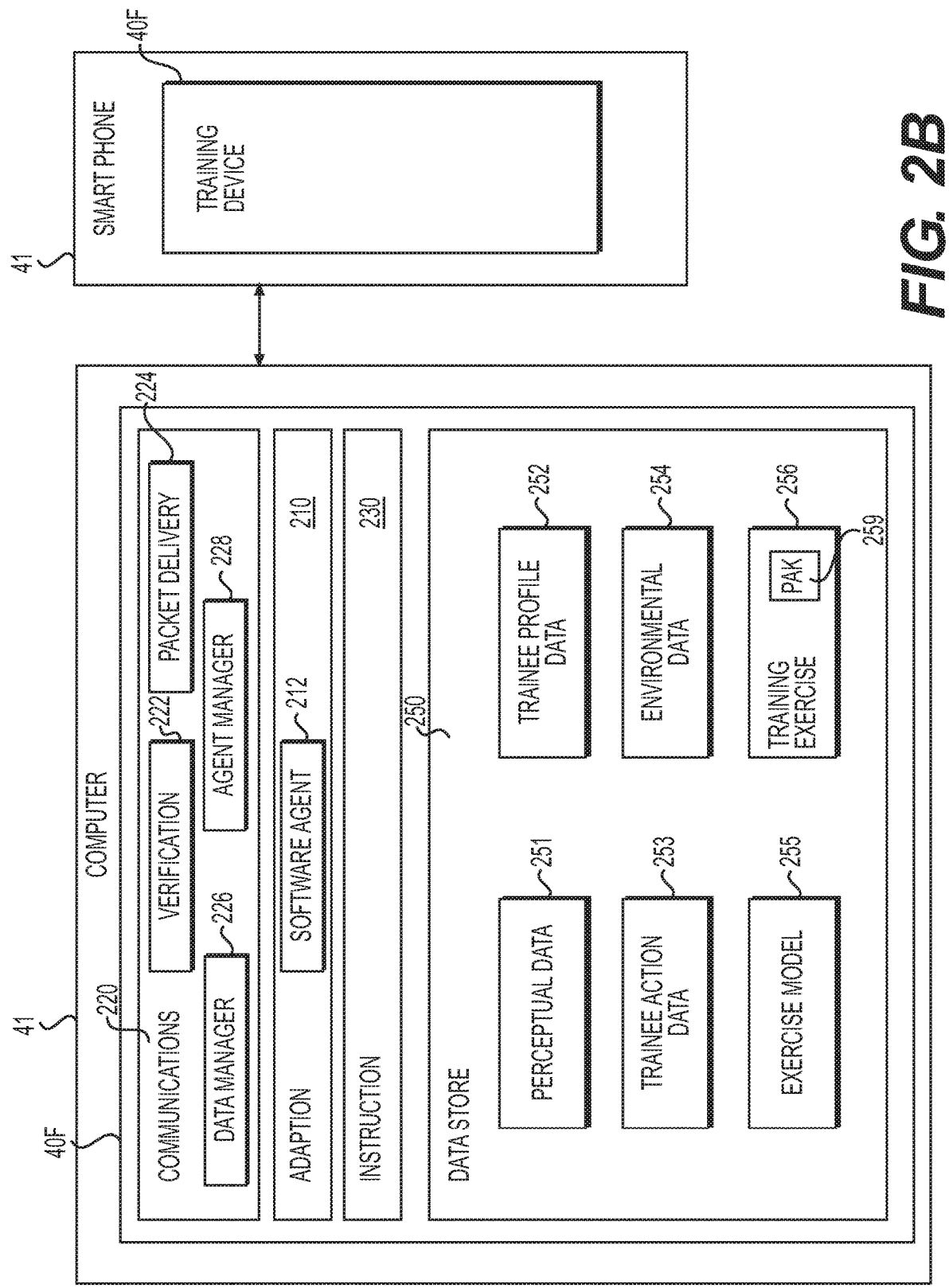

In an example, media device 41 may include, or be communicatively coupled with, components of the integrated, adaptive learning program 500. In an example, these components of the program 500 may execute to improve a trainee's performance in an individualized learning space, which may be enabled through and at the media device 41, or alternately through use of a virtual machine (VM). Because the trainee's performance may be affected by and/or correlated with many different factors, the adaptive learning program 500 may use the performance level of the trainee 11 when making decisions about adapting the instructional content of a training exercise executing in an individualized trainee learning space. As such, the program 500 may be configured with logic to dynamically adapt the instructional content output to a trainee 11 based on a determined performance level of the trainee 11. In an example, some of this logic may be contained in one or more modules of training device 40F, as shown in FIG. 2B, such as adaptation module 210, communications module 220, and instruction module 230. Note that training device 40F may be instantiated on more than one media device 41 being operated by, or under control of, trainee 11. For example, for a specific exercise scenario, the trainee 11 may operate or control a computer and a smart phone. In this situation, both the computer and the smart phone may include some or all modules of the training device 40F. For example, both devices may include communications module 220.

The communications module 220 includes components that allow the training device 40F to communicate with modules of the integrated, adaptive learning program 500. For example, the communications module 220 may provide a trainee verification component 222, which may be implemented as a sign-in and password entry window, or as a biometric reading component. The communications module 220 also may include a packet delivery component 224 that establishes and maintains two-way data packet flow between the training device 40F and the program 500. The component 224 may include, for example, a queueing device, a packet identifier device, a timer device, and other devices so that data transfers are executed in an orderly and error-free manner. The communications module 220 also may include a data manager component 226 that manages data in local training device database 250. Finally, in addition to other modules of the training device 40F, the communications module 220 may include an agent component 228. The agent component 228 may provide and control software agents that collect data related to actions taken during execution of a training exercise.

In an example, instruction module 230 includes components that execute to provide instructional content to the trainee 11, and adaptation module 210 includes components that execute to determine a current performance level of the trainee 11. In an example, adaptation module 210 cooperates with instruction module 230 to dynamically adapt the instructional content based at least in part on the trainee's determined performance level. In an aspect, adaptation module 210 may include a software agent component 212 that collects various types of trainee data, including trainee action data and trainee state data, that may be used in determining a current performance level of the trainee 11. In an example, the various types of trainee data may include perceptual data 251, trainee profile data 252, trainee action data 253, and environmental data 254, all of which may be stored in local training device database 250 under control of data manager component 226. The local training device database 250 also may store an exercise model 255, where appropriate. For example, the system 100 may be used by trainees 11 to increase their proficiency in handling cyber warfare attacks, in which case, the system 100 may download a copy of a communications network model on which cyber warfare exercises operate. Finally, the local training device database 250 may store a specific training exercise 256, or series of training exercises, to be executed using the training device 40F. The training exercise 256 may include programmable parameters 259.

Perceptual data 251 may include static data previously defined by a scenario developer for use during execution of a specific training exercise. The perceptual data 251 may be based on a specific scenario corresponding to the specific training exercise. Perceptual data 251 may be collected in real time using one or more sensors. Such sensors may include one or more cameras capable of capturing images or video, one or more microphones, a skin conductance sensor, eye tracking sensor, and/or a heart rate sensor. These sensors may be incorporated within media device 41 or may be communicatively coupled with one or more communication interfaces of media device 41. For example, integrated, adaptive learning system 100 may include or access sensors, such as those listed above, capable of producing data to be used in facial motion capture, eye tracking, speech recognition, and/or gesture/posture. Trainee profile data 252 may be associated with the individual trainee 11 and may contain characterizing parameters associated with the trainee 11. The trainee profile data 252 may be selected based after a trainee authentication process, such as through biometric information (e.g., facial recognition) or any other suitable authentication mechanism (e.g., trainee name and password, etc.). In an example, trainee characterizing parameters may include parameters associated with a trainee's current performance level. For instance, the components of the system 100 may execute to detect that one or more environmental factors may either increase or decrease a trainee's performance. For example, if the system 100 detects that the trainee's performance varies based on time of day, the system 100 may execute to enter this observation in the trainee's trainee profile data 252. Other characterizing parameters may include temperature, weather, and/or subject matter, and may also include performance levels associated with one or more of these characterizing parameters. In addition, these characterizing parameters may indicate a preferred scaffolding, or tutoring, structure for the trainee. For example, if the trainee responds better to written exercises than to video exercises, the system 100 could designate this as a characterizing parameter. The trainee action data 253 may include various actions taken by the trainee 11 during execution of a training exercise. For example, the trainee 11 may compose and send an email message or a text message during the training exercise, and the messages may be captured and stored in the trainee action data 253. The trainee action data 253 also may include keystroke data (if operating a computer, for example), and other actions taken by the trainee 11. Environmental data 254 may include data captured by various sensors. Environmental data 254 may include ambient noise levels, temperature, humidity, lighting conditions, and similar data.

Data 251-254, and any other data suitable for determining a performance level of the trainee, may be provided to adaptation module 210. The adaptation module 210 may be configured to receive these types of trainee profile data 252 and may use the trainee profile data 252 as part of a process for determining a performance level of the trainee 11. The determination of the performance level of the trainee is discussed further herein, including with respect to FIGS. 5A-7. While the trainee 11 interacts with program 500, the adaptation module 210 may continuously monitor one or more of the different data types discussed above for indicators of the trainee's current performance level. The adaptation module 210 also may be configured to receive, and instruction module 230 also may be configured to transmit, an indicator of content type and programmable parameters 259 associated with the instructional content. In an example, the content type may be associated with a type of instructional content and the programmable parameters 259 may indicate the parameters that may be used in adapting the instructional content. The adaptation module 210 may include a correlation component that executes to correlate a current content type with the indicators of the trainee's current performance level (i.e., during execution of the training exercise) to develop an evolving trainee state model. In an example, the evolving trainee state model may be used to better determine a performance level of the trainee 11 and an adaptation to the instructional content, specific to the trainee 11, which may increase the trainee's performance level. As the trainee 11 continues to interact with adaptive learning program, the adaptation module 210 may determine a change in the trainee's level of performance. In an example, once the trainee's performance level decreases below a predefined threshold, the adaptation module 210 may execute, in cooperation with the instruction module 230, to adapt the instructional content by notifying the instruction module 230 of an increase or decrease in the trainee's performance level and/or using the programmable parameters to cause the instruction module 230 to adapt the instructional content. In an aspect, the adaptation of instructional content may include decreasing, or downgrading the fidelity of the training exercise. Decreasing or downgrading training exercise fidelity is described in more detail herein. The above described process may repeat for the duration of the trainee's use of program 500.

The instruction module 230, in cooperation with the adaptation module 210, may adapt the instructional content of a training exercise in real time or near real time; i.e., during execution of the training exercise by a trainee 11. The modules also may change the instructional content of a training exercise after the exercise is completed. In an aspect, the instructional content of a training exercise relates to the fidelity, or realism, of a corresponding training scenario. A specific training scenario may be one of a series of varying fidelity scenarios. When a trainee 11 is not able to successfully complete a training exercise having a specific fidelity, the modules may execute to select a training scenario having a lower fidelity level. Conversely, when a trainee 11 successfully completes a training exercise, the modules may select a next training scenario having a higher level of fidelity.

Figure 2C:
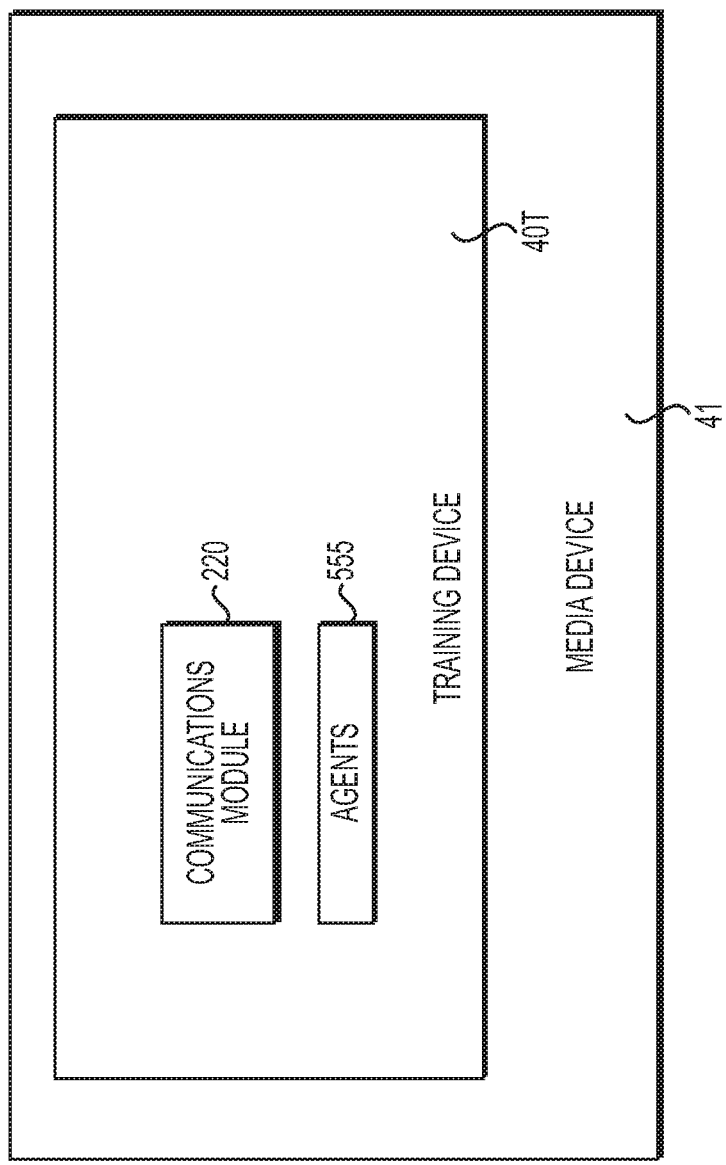

As noted herein, in an example, the adaptation module 210 and the instruction module 230 may be instantiated on a training device 40F. That is, much of the monitoring, evaluation, and adaptation functions of the program 500 are locally provided on a trainee's media device 41. In another example, the monitoring, evaluation, and adaptation functions largely are executed by modules that may be instantiated remotely. FIG. 2C illustrates a training device 40T that functions primarily as a communications conduit between media device 41 and program 500. In FIG. 2C, training device 40T is installed on media device 41, which may be a personal computer. The training device 40T includes communications module 220, described above with respect to FIG. 2B. The communications module 220 interacts with existing components of media device 41 and receives and transmits data between the media device 41 and the program 500. In an aspect of this example, the training device 40T may operate to establish on the media device 41, access to a virtual machine (VM).

In an example, the herein disclosed system is implemented as a virtual computing network in which network components are subjected to a number of challenges during which events are injected into the network and trainees are expected to take actions to counter the challenges. As a specific example, the system is implemented as a cyber security application in a specially designed environment. A rifle range allows infantrymen, for example, to practice their skills in live fire exercises. Rifle ranges may be simple, consisting of a firing line and a number of fixed targets. Other rifle ranges may involve moving targets or may require trainees to move through the range. As a corollary to a rifle range, a cyber range allows an organization's trainees to practice cyber warfare skills in an environment that includes as many realistic aspects of a network as possible without use of the organization's actual, or "live" network. In a cyber range, problems (advanced persistent threats, zero-day attacks, denial of service attacks, etc.), may be presented without risking damage to, or interfering with, an existing physical network. That is, the virtual network of the cyber range is logically isolated so that virtual network components can only be accessed by a trainee 11 and so that the trainee 11 and the virtual network components, when subjected to challenges, cannot communicate with other training networks, the physical network, and other components outside the cyber range. The cyber range may be constructed in room or structure that is isolated from other portions of an organization and that cannot, therefore, interact with the organization's "live" network. In an aspect, a cyber range may be implemented in a secure facility such as a secure compartmented information facility (SCIF) with no external network access. Alternately, the cyber range may provide controlled Internet access. At the end of the cyber warfare training exercises, the conditions of the network may be "reset." Thus, a cyber range may start with a higher degree of realism, or fidelity, than, for example, a table top exercise.

Figure 3:
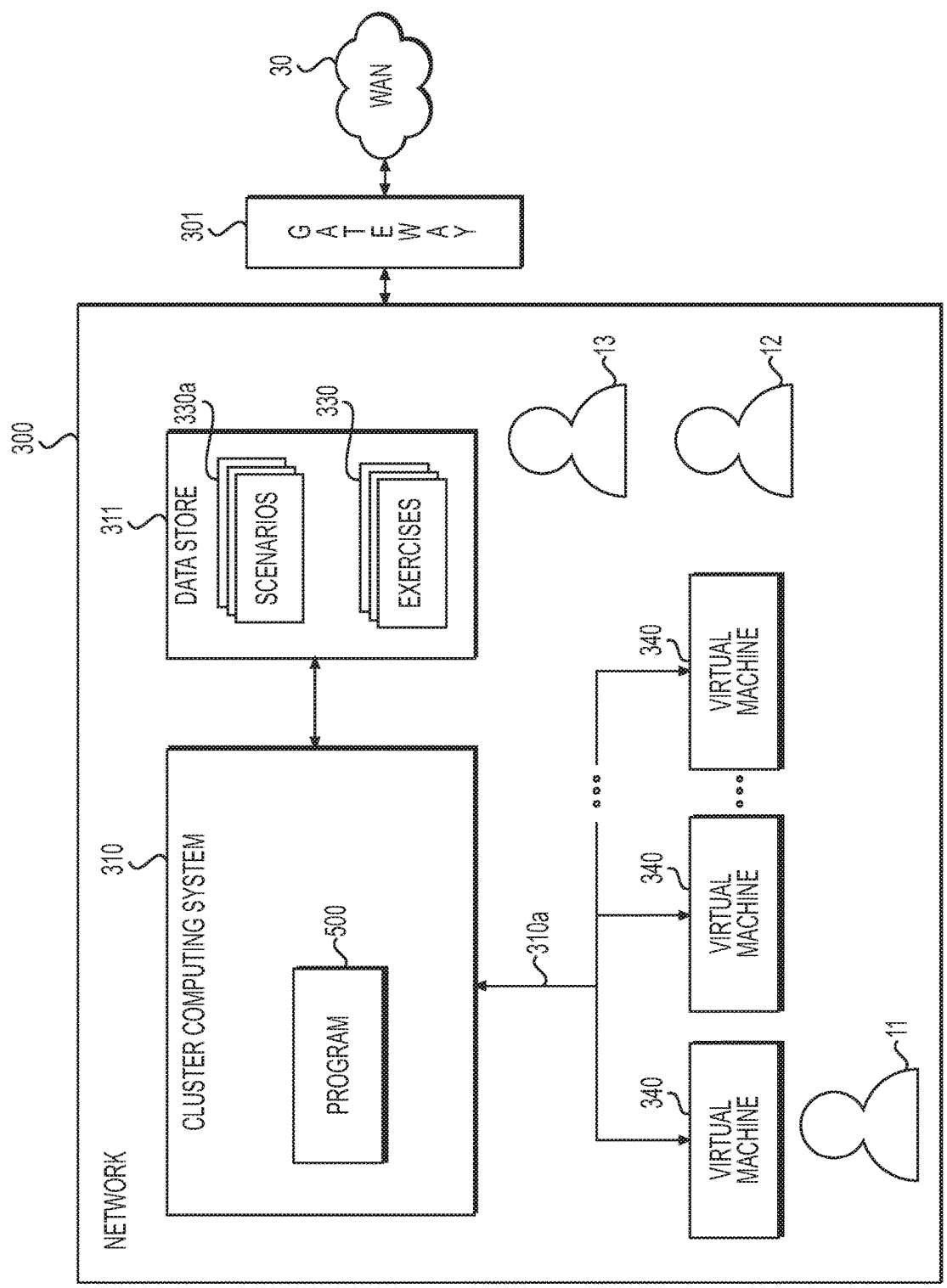
FIG. 3 illustrates another example system for evaluating and optimizing training effectiveness.

FIG. 3 illustrates includes an automated, instrumented, virtual variable-fidelity computing network 300 coupled by gateway 301 to network 30, which may be a wide area network (WAN). In an example, the computing network 300 is implemented on a cluster computing system 310 running a program of instructions (i.e., the program 500) that provides trainees 11 with access to computer-based training exercises 330 that are hosted on virtual machines 340 on the cluster computing system 310. The computing network 300 includes data store 311, which in turn stores scenarios 330a and training exercises 330. The computing network 300 provides individual trainees 11 with a private exercise network 310a and virtual machines 340. In an aspect, each virtual machine 340 may be isolated from other virtual machines 340 on the cluster computing system 310, so that many training exercises 330 may be conducted simultaneously and independently. For group training scenarios, certain of the virtual machines 340 may be in communication with each other. Training exercises 330 may be provided on demand based on corresponding training scenarios 330a, and many instances of a single training exercise 330 may run simultaneously. The computing network 300 provides fine-grained training exercise monitoring and evaluation capabilities. In an aspect, the monitoring and evaluation capabilities are implemented through use of software agents deployed on to the virtual machines 340. The computing network 300 enables a training scenario developer 13 to create an evaluation program that describes in detail, what tasks are to be accomplished in the training exercise 330 and how completion of those tasks may be evaluated. The program 500 then executes to monitor the training exercise 330 and, in an aspect reports, in real time, the trainee's progress. The trainee's progress report may be used by a live observer/instructor 12 to monitor the trainee's progress, may be used in an after-action report by the observer/instructor 12 or the trainee 11, and/or may be used to programmatically determine the trainee's score for the training exercise 330.

The virtual variable-fidelity computing network 300 includes an adaptation mechanism for programmatically reducing the fidelity of a training scenario 330a, creating one or more new, lower-fidelity training scenarios. A training scenario developer 13 may begin by creating a high-fidelity base training scenario and, at the same time, a computer-readable description or script of how individual aspects of the training scenario can be reduced in fidelity. The adaptation mechanism then may process the description information to dynamically generate a large number of different, reduced-fidelity training scenarios 330a. that are derived from, and share many or some of the features as exist in the base high-fidelity training scenario. This enables rapid experimental testing and evaluation of training scenarios having different fidelity levels.

The program 500 instruments the training exercise 330 with sensors that record not only progress toward exercise goals, but also ancillary data, such as trainee sensory and behavioral data, that could be of value in a training impact model. In an aspect, the computing network 300 may employ other sensors, such as video, audio, motion, and environmental sensors to gather information related to the trainee's experience and performance.

Figure 4:
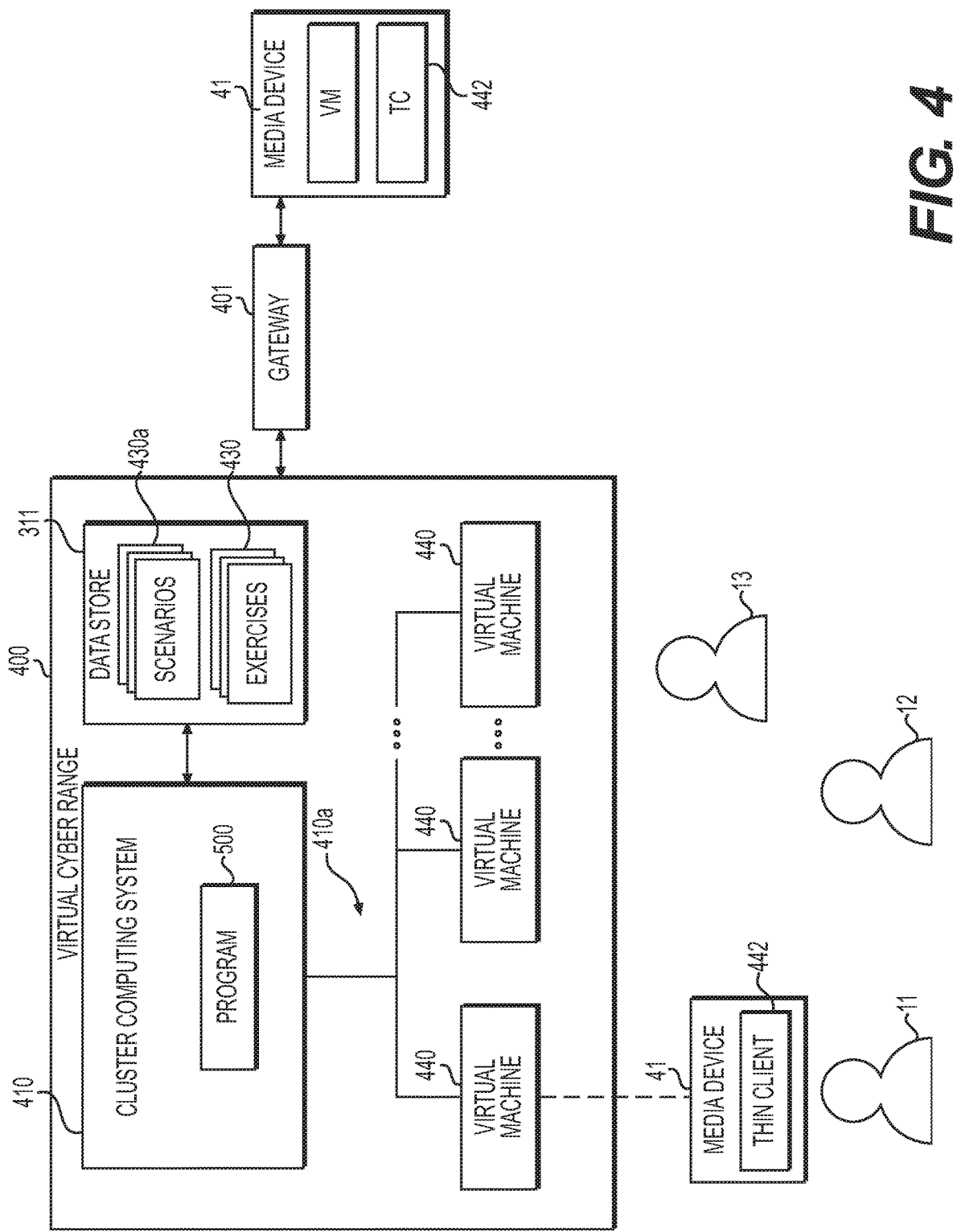
FIG. 4 illustrates yet another example system for evaluating and optimizing training effectiveness
Figure 5A:
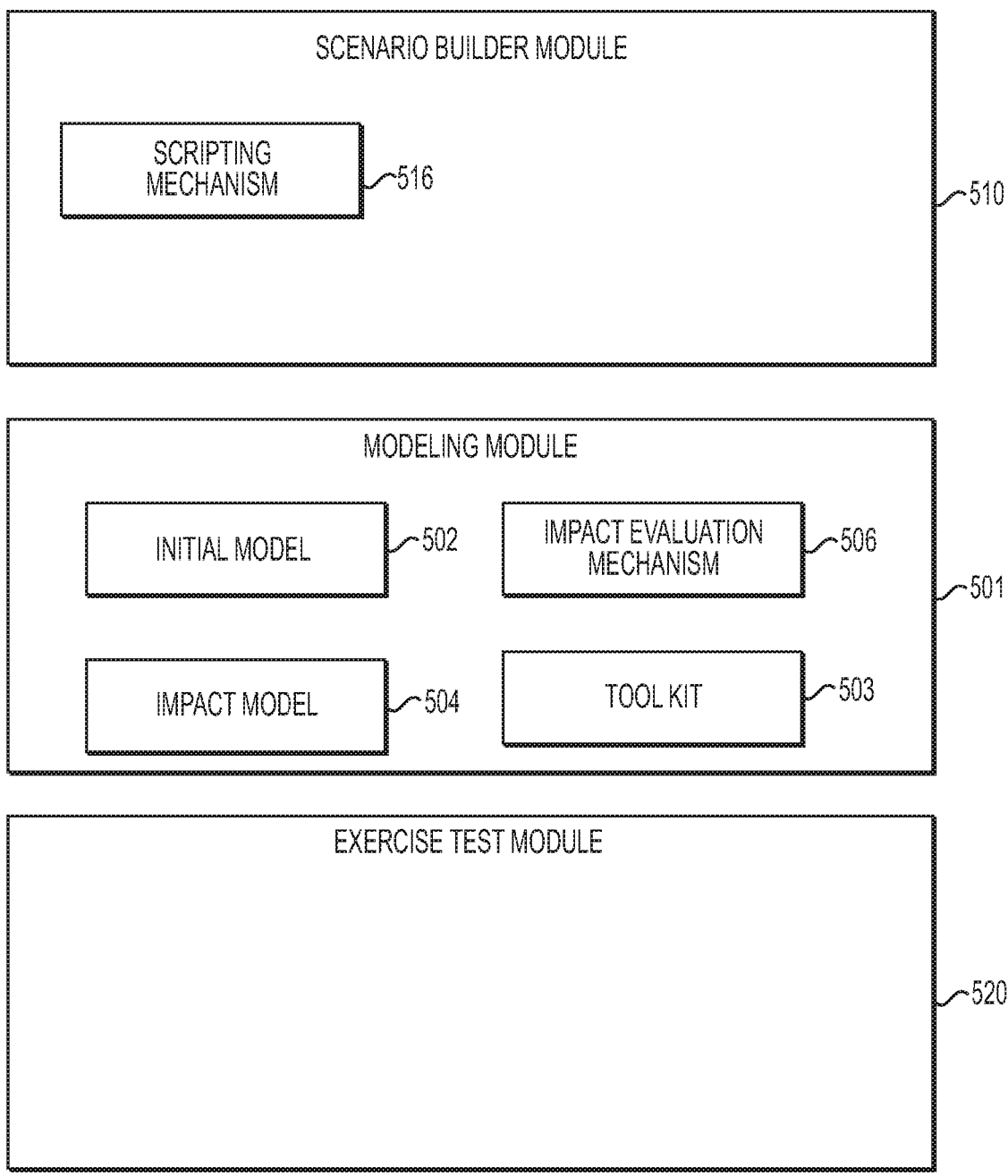
FIGS. 5A-7 illustrate example components of a system for evaluating and optimizing training effectiveness.
Figure 5B:
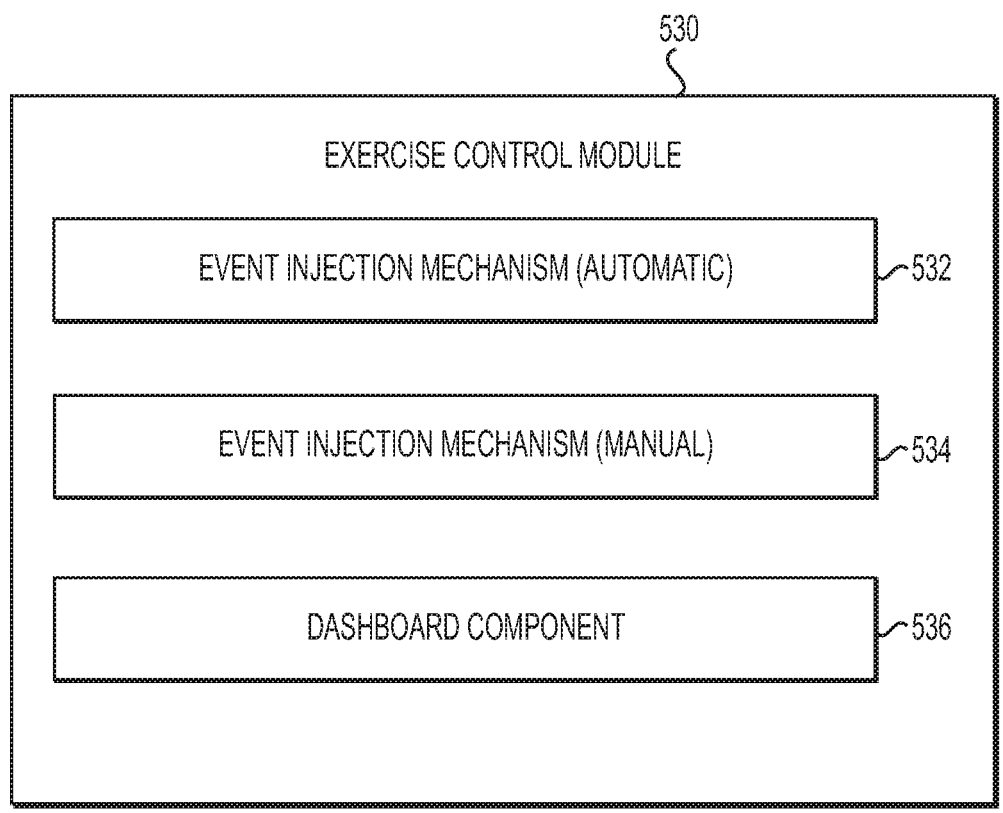
Figure 5C:
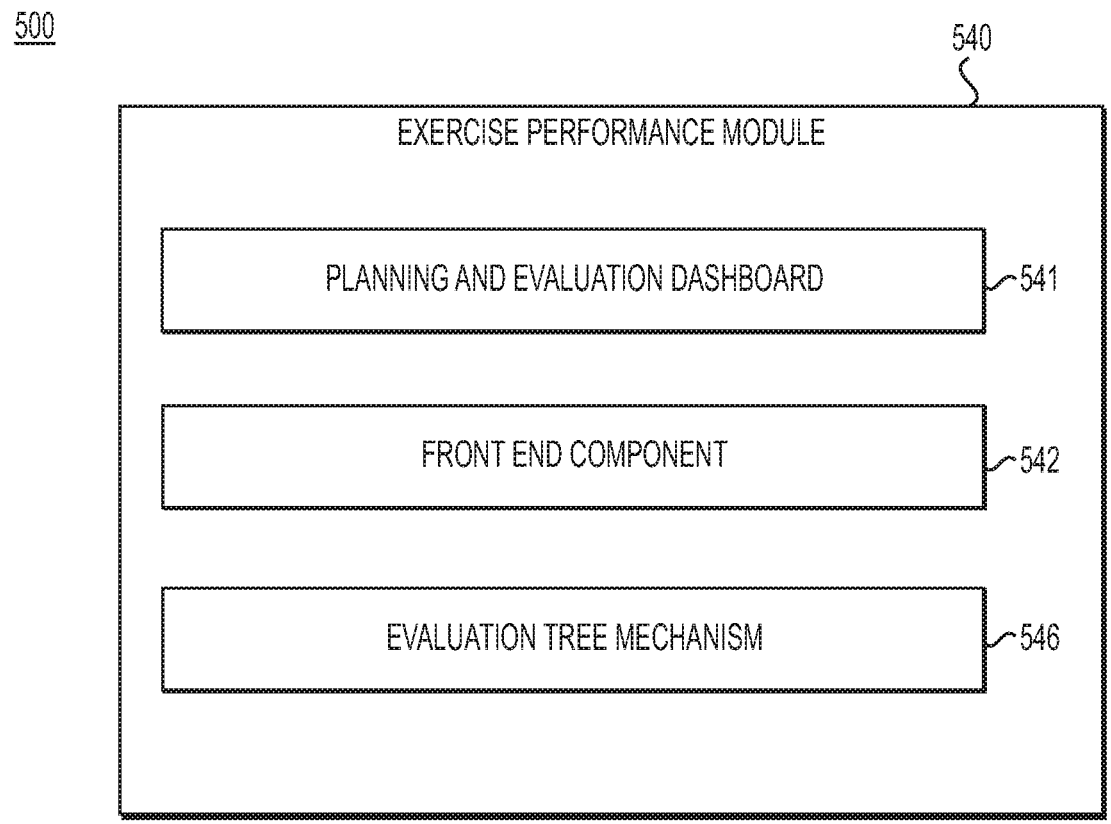
Figure 5D:
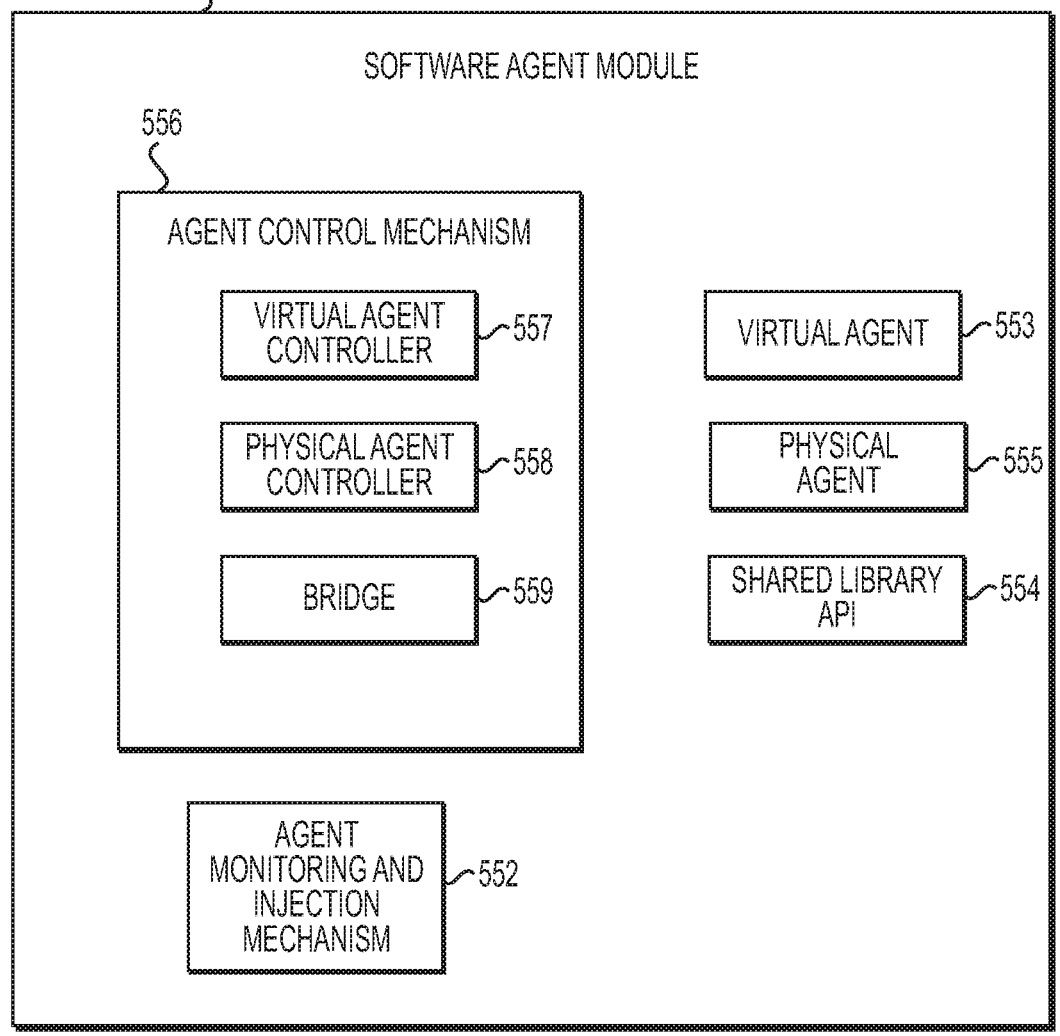
Figure 5E:
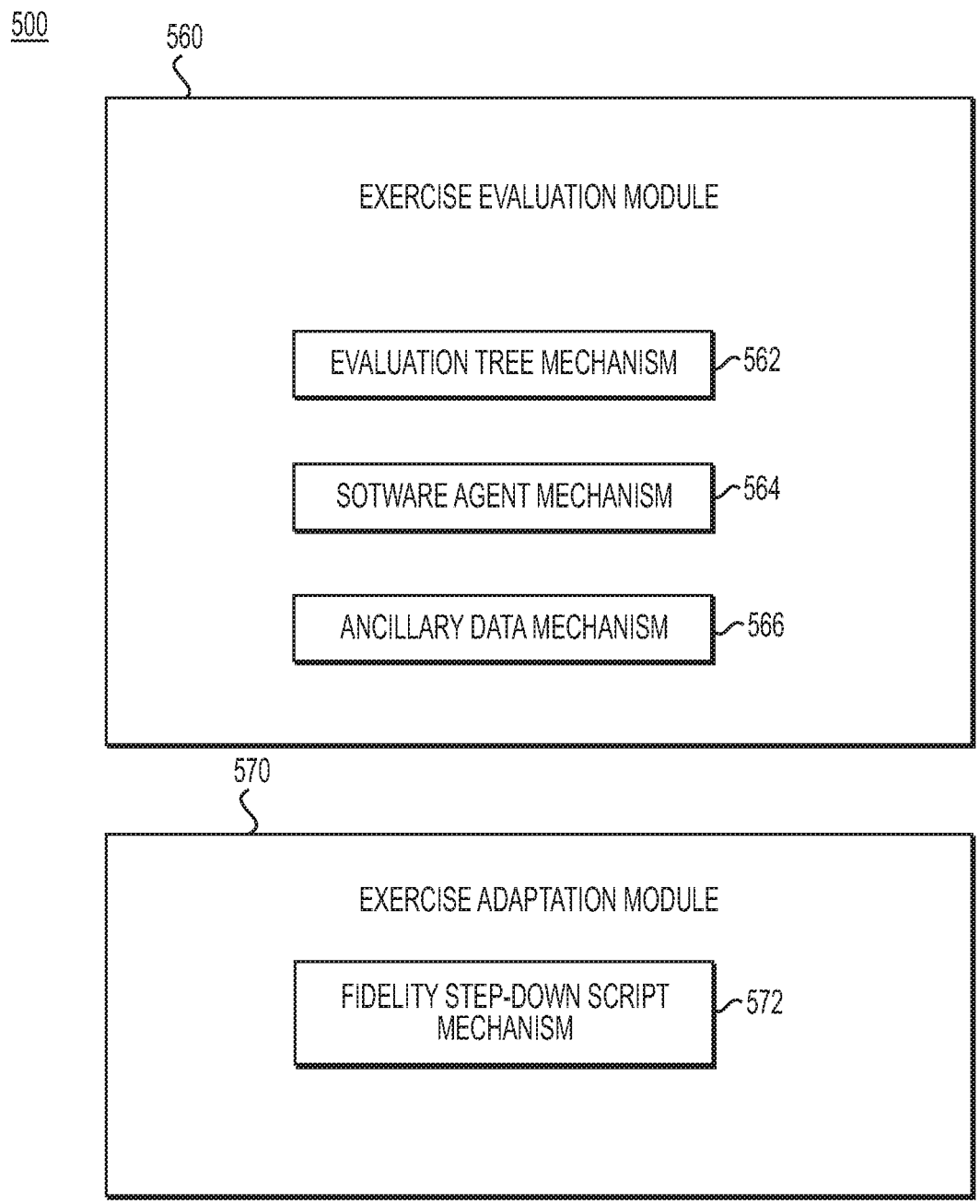
Figure 5F:
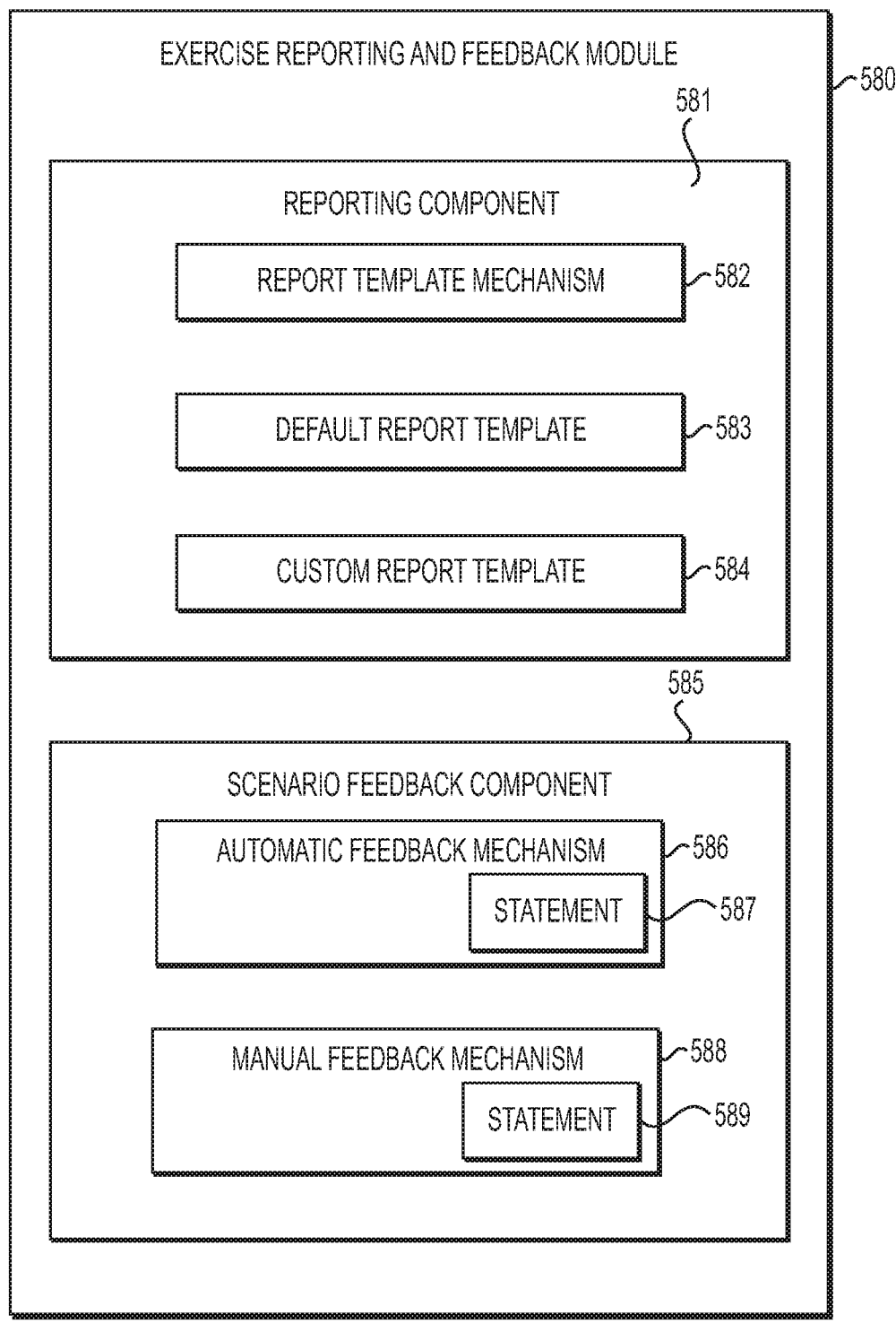
Figure 5G:
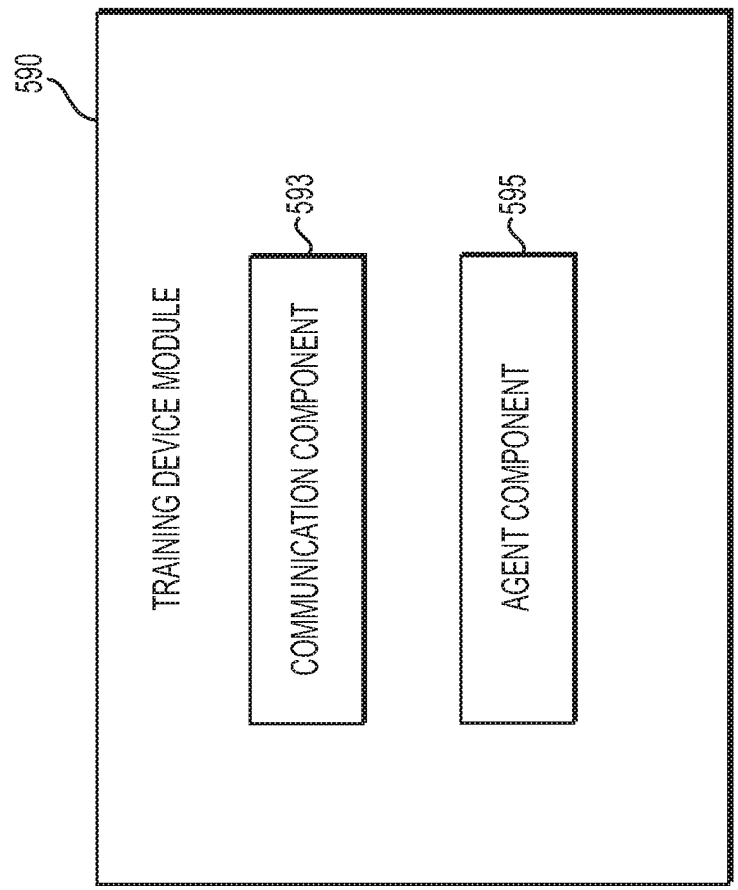

FIG. 4 illustrates another example of an automated, virtual, variable-fidelity cyber range system. In FIG. 4, automated, virtual, variable-fidelity cyber range system 400 is a remotely-accessible cyber range that employs one or more virtual machines 440 useable by trainees 11 to interact with a training program 500. With virtual, variable-fidelity cyber range system 400, trainees 11 do not have to be physically present at the cyber range itself, and do not have to undergo training exercises at the same time. The virtual cyber range provides the capability for hands-on exercises. The system 400 may be implemented as a small-scale cloud computing platform that provides platform-as-a-service, and, more specifically, desktop-as-a-service. The system 400 creates virtual machines and virtual networks on an as-needed basis to trainees 11; access to these machines may be provided through a virtual network computing (VNC) connection (shown in dashed line), giving trainees 11 desktop access via media device 41; alternately, access is provided through gateway 401.

In FIG. 4, virtual, variable-fidelity cyber range system 400 includes a cluster computing system 410 running a program of instructions (e.g., the program 500) that provides trainees 11 with access to computer-based training exercises 430 that are hosted on virtual machines 440 on the cluster computing system 410. The system 400 provides individual trainees 11 with a private exercise network 410a and exercise virtual machines 440. The system 400 further may provide trainees 11 with a thin client module 442 that may be instantiated on media device 41 operated by the trainee 11. In an aspect, each exercise virtual machine 440 is isolated from other exercise virtual machines 440 on the cluster computing system 410, so that many training exercises 430 can be conducted simultaneously and independently. For group training scenarios, certain of the exercise virtual machines 440 may be in communication with each other. Training exercises 430 may be provided on demand. Each training exercise 430 may be an identical clone of a corresponding training scenario 430a, and many instances of a single training scenario 430a may run simultaneously. The virtual, variable-fidelity cyber range system 400 provides fine-grained training exercise monitoring and evaluation capabilities. In an aspect, the monitoring and evaluation capabilities are implemented through use of software agents deployed on the exercise virtual machines 440 and optionally deployed with the thin client modules 442. The system 400 may include an evaluation program that describes in detail, what tasks are to be accomplished in the training exercise 430 and how completion of those tasks may be evaluated. The system 400 then may use a monitoring program to monitor the training exercise 430 and, in an aspect report, in real time, the trainee's progress. A trainee's progress report may be used by a live observer/instructor 12 to monitor the trainee's progress, may be used in an after-action report by the observer/instructor 12 or the trainee 11, and/or may be used to programmatically determine the trainee's score for the training exercise 430.

In any of the examples shown in FIGS. 1A-4, the integrated, adaptive learning system 100 provides the functions of scenario development, exercise execution, exercise monitoring, exercise evaluation, exercise adaptation, and scenario feedback, which may be implemented in one or more of a scenario builder module, an exercise test module, an exercise controller module, an exercise performance monitor module, a software agent module, an exercise evaluation module, an exercise adaption module, an exercise reporting and scenario feedback module, and a training device module, as shown in FIGS. 5A-5G.

An example variable-fidelity training scenario is now described. The scenario is directed to a cyber warfare attack. Fidelity, or realism, of a training scenario may encompass how realistic the scenario is to an actual cyber warfare attack, how closely the training network corresponds to an actual physical network, including how closely the training network corresponds to the actual physical network of an organization, how closely the indications of the cyber warfare attack correspond to indications that would be observable on the actual physical network, how closely any actions taken by a trainee would, if applied to an actual cyber warfare attack on the actual physical network, be reflected in the operation of the actual physical network, and other factors. Fidelity should not be confused with complexity. A distributed denial of service DDoS attack scenario may be more complicated that a single host denial of service attack but need not be more realistic in terms of simulated indications and network responses. However, some cyber warfare attacks may be quite complex, and a realistic training scenario should capture as much of the complexity of an actual attack as possible. The example varying fidelity training scenario, begins, at a highly challenging level, as an advanced persistent sub-saturating distributed denial of service attack that is used to divert attention from the real purpose of the attack, namely theft of personnel information such as passwords, bank account numbers, social security numbers, and other sensitive, and easily exploitable data by a hacker. The DDoS attack may include a SYN flood attack using one or more botnets. The scenario is designed with a series of success-based goals: A highest success goal includes identification and prevention of the attempted theft; identification and blocking of a percentage of the DDoS components; allowance and processing of legitimate traffic, and system stabilization within a specified time. A lower success goal is to prevent the attempted theft and maintain legitimate network traffic at at least 50% of capacity. A still lower success goal is to prevent the attempted theft. Failure is allowing the attempted theft and complete flooding of the network. Using the network architecture, the intended scenario, and other data, the scenario developer 13 can establish various decision points that would degrade training exercise fidelity based on the trainee's actions. For example, if the trainee 11 does not recognize, and react to, any of the symptoms of a DDoS attack within the first 30 minutes of the attack, the training scenario may automatically downshift to a simple DoS attack from a single source. Alternately, the training exercise may downshift to provide an indication, or prompt, that a DDoS attack is in progress, so that the trainee's response to a known attack may be evaluated. In another alternative, since many DDoS attacks take time to show noticeable symptoms, the training exercise may artificially speed up the pace of the botnet attack. Of course, if one aspect of the training exercise is to see if the trainee can recognize a slowly developing botnet attack, and take timely corrective action, artificially speeding up the attack could be disregarded. To this end, the observer/instructor 12 may have the option to "turn on" and "turn off" various decision points, so as to override automatic (default) fidelity adjustment. If the trainee 11 does recognize the symptoms of a DDoS attack, but not the attempted theft, the training scenario may automatically downshift to just a DDoS attack. If the training scenario downshifts, the goals may adjust to match the lower fidelity scenario.

Figure 6A:
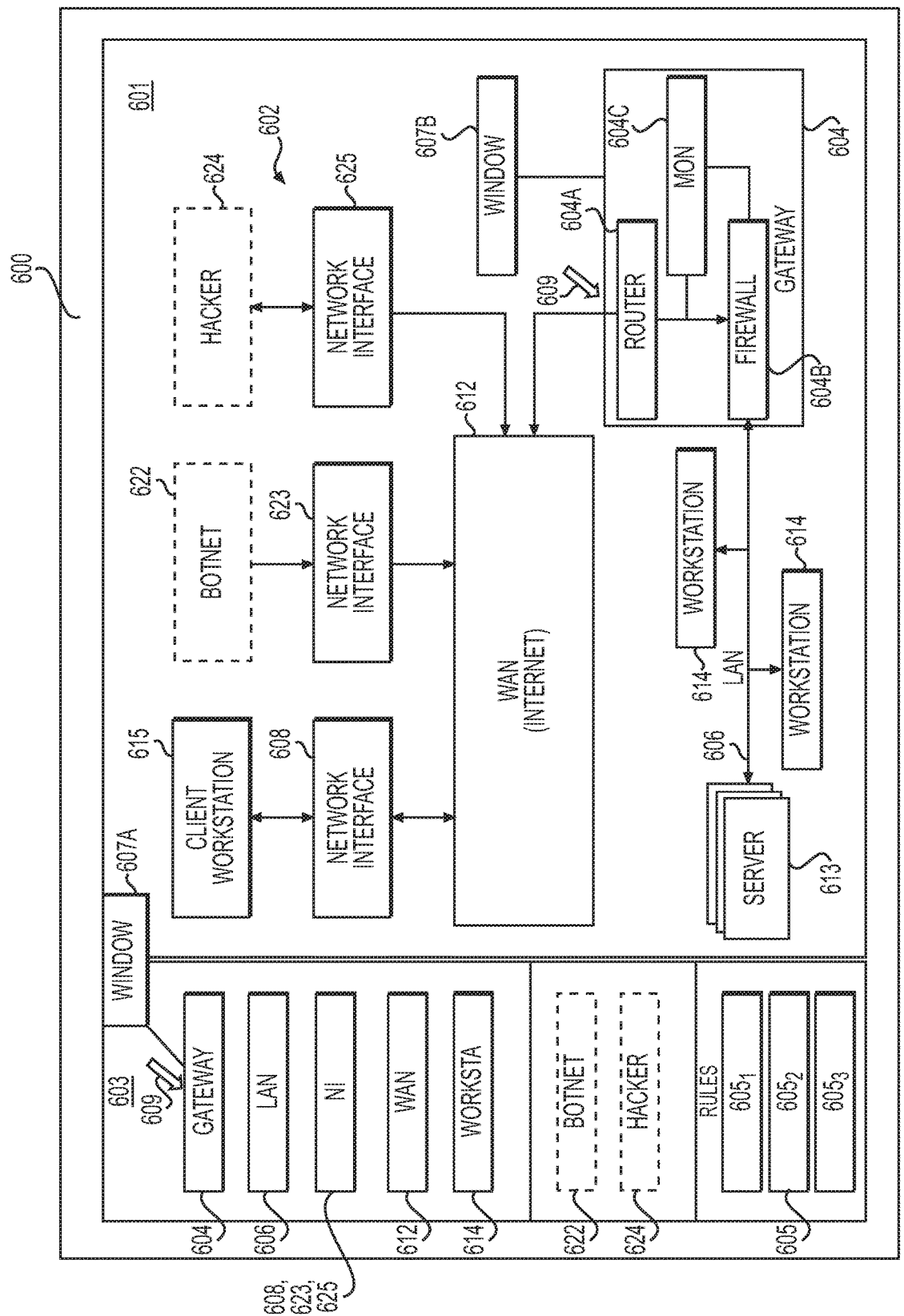

The components of the integrated, adaptive learning system 100 of FIGS. 5A-5G will be described considering a DDoS scenario, and in particular, a SYN flood attack. In normal (non-attack) situations, a host processing system, upon receiving a TCP/IP connection request (e.g., a packet with a SYN (synchronize) flag set) allocates memory resources (e.g., a backlog queue) to the request. The connection request remains "half-open" until a "three-way handshake" process is completed, at which point the memory resources are released. In some operating systems, this process for a single SYN request can take about three minutes. The host processing system may include a mechanism to purge the backlog queue of half-open connection request after a specified time. Furthermore, the host's processing system can handle only a defined amount of half-open connections in the backlog queue. This defined amount is controlled by the size of the backlog queue. In a SYN flood attack, a malicious agent (e.g., a botnet) tries to create a large number of half-open TCP/IP connections at a target to cause the target's backlog queue to overflow, and the target's processing systems are overwhelmed and cannot process incoming connection requests. To increase the effectiveness of a SYN flood attack, an attacker may spoof source IP addresses of SYN packets. In this case, the target cannot finish the initialization process in a short time because the source IP addresses are unreachable. This malicious operation is called a SYN spoofing attack. Turning to FIG. 6A, a SYN flood attack may be directed against LAN 606 and servers 613 from botnet 622. In an aspect, the SYN flood attack may be partially implemented as a diversion for a hacker 624 to access private, sensitive, or confidential information. The SYN flood attack begins when the botnet 622 sends a succession of SYN (synchronize) requests to LAN 606 and servers 613 in an attempt to consume enough server resources to make the servers 613 unresponsive to legitimate traffic (e.g., traffic from client workstation 615). Normally when a client such as the client workstation 615 attempts to start a TCP connection to the servers 613, the client workstation 615 and server 613 exchange a series of messages (the TCP handshake) which begins with the client workstation 615 requesting a connection by sending a SYN message to the servers 613, followed by the servers 613 acknowledging the request by sending SYN-ACK back to the client workstation 615, and finally, the client workstation 615 responding with an ACK, to establish the connection between the servers 613 and the client workstation 615. This message sequence is standard for connections established using the TCP/IP protocol. However, in the SYN flood attack, the botnet 622 does not respond to the server 613 with the expected ACK code. The botnet 622 may simply not send the expected ACK, or may spoof the source IP address in the SYN, causing the servers 613 to send the SYN-ACK to a falsified IP address—which will not send an ACK because the device at the falsified IP address did not send the original SYN. The servers 613 will wait for the acknowledgement (ACK) for a time because simple network congestion also could be the cause of the missing ACK. However, in a SYN flood attack, the half-open connections created by the botnet 622 bind resources on the servers 613 and may eventually exceed the resources available on the servers 613. At that point, the servers 613 cannot connect to any clients, which effectively denies service to legitimate clients such as client workstation 615.

Referring to FIGS. 5A-5G, program 500 includes scenario builder module 510, modeling module 501, and exercise test module 520. The modeling module 501 includes various models and mechanism for generating models. The exercise test module 520 includes mechanisms and components used to control exercises and to evaluate exercise performance. These mechanisms and components are disclosed herein, including with reference to FIGS. 5B-5G. Scenario builder module 510 allows a scenario developer 13 to create, evaluate, and refine an exercise scenario (e.g., the above-describe SYN flood attack). Scenario development may follow a protocol that begins with generation of an initial model 502 for training effectiveness and fidelity. That is, the protocol defines measures of effectiveness and points where fidelity may be varied, either automatically, or manually by interjection from an observer/instructor 12. Thus, the initial model may address the question: given a set of fidelity-reducing decisions that have been applied to a base exercise to produce a reduced-fidelity exercise, what is the training effectiveness of that reduced-fidelity exercise? The initial model 502 incorporates practical measurements limitations because the training effectiveness as defined by the initial model 502 may incorporate what the system 100 directly measures or measures by proxy.

The protocol may be extended to create a training impact model 504 that in turn is used to determine a training scenario impact evaluation mechanism 506, where the training impact model 504 is used to evaluate a single scenario that is under development. The training impact model 504 also may use only easily-measurable observables to ensure the accuracy of the impact evaluation mechanism 506. The training impact model 504 then is used during the creation of training scenarios to estimate training efficiency and to optimize optimizing training efficiency balanced with the costs of developing and delivering the training. To facilitate model development, program 500 includes toolkit 503, which among other functions implements a drag and drop mechanism and a pop-up window mechanism.

In an aspect, the scenario builder module 510 is implemented as a web application that lets a scenario developer drag and drop components to build up a training platform (e.g., a network, system, virtual structure, or model) to be used for training exercises. In the example of a cyber warfare scenario, the web application may be used to construct a virtual network 602, as shown in FIG. 6A. Referring to FIG. 4, the trainees' virtual machines 440 then may be defined by importing standard OVA files containing virtual machine 440 disk images and descriptions provided through the web application.

Returning to FIG. 5A, the scenario builder module 510 also includes scripting mechanism 516 that generates a script for each scenario, including a base, high-fidelity scenario, and optionally, one or more associated, successively lower-fidelity training scenarios, and a corresponding timeline for the scenario.

Returning to FIG. 6A, user interface 600 includes display area 601 and menu area 603. The display area 601 may be used to present virtual network 602, which is seen to include wide area network (WAN) 612 (e.g., the Internet). Coupled to the WAN 612 is gateway 604, to which is coupled local area network (LAN) 606, servers 613, and finally workstations 614. The servers 613 may host an Internet Web site, for example. That is, one or more of the servers 613 may, in addition to other functions, act as an HTTP server. The gateway 604 may be configured to include edge router 604A, firewall 604B, and monitor 604C between the edge router 604A and the firewall 604B. The firewall 604B may include configurable parameters related to traffic through the gateway 604. The monitor 604C may log certain indications from traffic through the gateway 604. The LAN 606 is the portion of virtual network 602 that may be vulnerable to a cyber warfare attack, in particular a SYN flood attack. Also connected to WAN 612 is client workstation 615 through network interface 608. In the example virtual network 602, the client workstation 615 is remotely-located component and is not a component of the LAN 606. However, the client workstation 615 would not be used to directly launch a cyber warfare attack on LAN 606. Also shown in FIG. 6A, botnet 622 is coupled through network interface 623 to WAN 612 and a hacker 624 is coupled through network interface 625 to WAN 612. As is obvious by its name, botnet 622 may be used to launch a SYN flood attack on LAN 606 and servers 613.

A scenario developer may construct virtual network 602 by dragging and dropping virtual network objects from menu area 603. In an aspect, each network object may have a default set of rules and characteristics. The default rules and characteristics may be provided in a pop-up window 607A that is displayed when the scenario developer 13 hovers a pointing device 609 over the network object, either in the menu area 603 or in the display area 601. Also included in menu area 603 are rules 605, which the scenario developer 13 may apply to change the configuration or performance characteristics of the network objects that are used to construct the virtual network 602. For example, the scenario developer 13 may use rule 6051 to establish the configuration of gateway 604. More specifically, rule 6051 may be used to configure gateway 604 for packet filtering and or application filtering, or configure a gateway proxy. In an aspect, the scenario developer 13 configures virtual network 602 to match as closely as possible an actual physical communications network that is to be protected against cyber warfare attack. Once modified by application of a rule 605, the network object, when hovered over by a pointing device 609, provides a pop-up window 607B displaying the changed configuration of the network object.

Figure 6B:
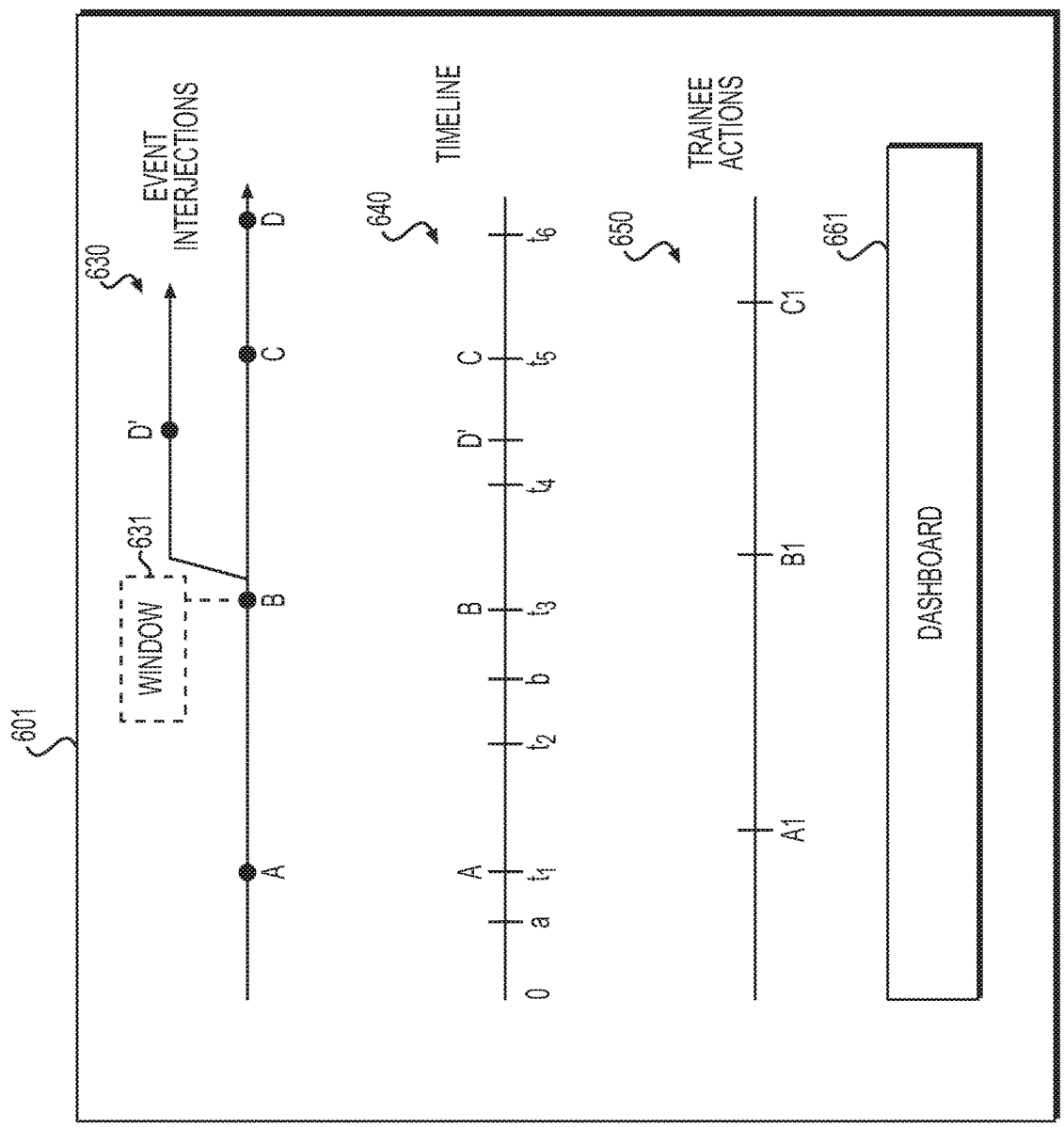

Returning to FIG. 5A, exercise test module 520 may be used by observer/instructor 12 to view progress of a training exercise. In an aspect, the exercise test module 520 may be implemented as a web application and may provide representations of a training exercise on display area 601. In FIG. 6B, display area 601 presents three such representations: an interactive scenario script 630, an exercise timeline 640, and a trainee action sequence 650. Display area 601 also provides dashboard 661, through which an observer/instructor 12 may interact with the display. Script 630 is a visual representation of a scenario script prepared by the scenario developer 13. Script 630 is interactive in that it includes a number of points (labeled in FIG. 6B as A, B, C, and D), where an event injection may occur and/or where the scenario may diverge in response to actions taken by the trainee 11 during execution of a corresponding training exercise. In the example SYN flood attack, the expected events follow line A-B-C, where Event A may be an increase in delay responding to SYN messages, and which may eventually result in shutdown of server 613 (Event B). At point A, trainee 11 may notice the effects of the SYN flood attack and may take some action in response. At event B, the indications are such that the trainee 11 should understand that a DoS attack is occurring, and should take corrective action to mitigate its consequences. However, the trainee's actions may cause a split in the flow of the training exercise. For example, after Event B, the trainee 11 could take a first course of action, and the scenario script 630 proceeds to point C. Alternately, the trainee 11 could take a second course of action, and the scenario script 630 proceeds to point D'.

Timeline 640 indicates actual clock time as the training exercise progresses, including projected and then actual clock time for each point A, B, C, D, D'. Timeline 640 also includes points where a trainee 11 takes a specific action or actions. For example, timeline 640 may include points a and b, where a more perceptive trainee would be expected to take actions.

Trainee action sequence 650 records actual times at which the trainee 11 takes actions in response to events shown in scenario script 630. In an aspect, a pop-up window, similar to window 631, may display actions taken by the trainee 11 at each recorded point along action sequence 650.

In an example, certain events on the scenario script 630 may be moved, or shifted in time, by the observer/instructor 12. In an aspect, the observer/instructor 12 may move an event, such as Event A or Event B to an earlier time, and some event movements may result in a reduced-fidelity training exercise using a drag and drop operation, for example. In an aspect, the pop up window 631 associated with an event may display optional, lower-fidelity events that may be selected manually by the observer/instructor 12. Other events may be moved or deleted automatically, thereby reducing training exercise fidelity. Still other events may be substituted for automatically, thereby reducing fidelity of the training exercise. Movement, deletion, and substitution of events in the scenario script 630 may occur automatically based on the trainee's actions or non-actions. For example, if the trainee 11 fails to take any action in the face of sufficient indications of a SYN flood attack, a less subtle (and perhaps not totally realistic) indication of the attack may be presented to the trainee 11.

In FIG. 6B, the SYN flood attack scenario will provide a variable, timed sequences of SYN attack indications, and the scenario may have associated with it one or more of these indications, and one or more actions expected from the trainee 11. For example, at point B (Event B) in the scenario script 630, the trainee 11 may be provided with an indication that HTTP service is down for one of the servers 613. If the trainee 11 were to check, the trainee 11 would find the backlog queue at a max count condition. The trainee 11 would be expected to check SSH performance, check for a max counts reading from the monitor 604C, restart the server 613, and determine if it quickly reaches its max count limit. Next, the trainee 11 should check the number of TCP connection requests in a SYN_RECV state. A large number would be unusual, and may indicate a DoS or DDoS attack. The checks are expected actions from the trainee 11. However, the trainee 11 should take further actions to mitigate the attack. One such action is to notify an IT supervisor (if appropriate), which can be done by email, text message, or telephone. Another action is to try to block the attack. The trainee 11 may identify the incoming IP addresses and write a script to block the IP addresses (e.g., block IP addresses with more than 20 half-open connections). However, this last action may not be effective. The trainee 11 then may try to harden the TCP/IP stack by changing default values of stack variables (e.g., decreasing the time of keeping a pending connection in the SYN_RECV state by decreasing the number of packet retransmissions or turning off packet retransmissions entirely). The trainee 11 should recognize that the botnet 22 can counter these actions by sending a larger number of SYN requests; however, the actions may allow legitimate traffic to the server 613. As the SYN flood (and hack) continue, the trainee would be presented with additional indications and would be expected to take additional actions. A successful training exercise may be defined as preventing the hack, allowing (possibly at a reduced rate) legitimate traffic to the server 613.

Returning to FIG. 5B, exercise control module 530 includes mechanisms that provide automatic and manual control of training exercises. The mechanisms include automatic event injection mechanism 532 and manual event injection mechanism 534. The automatic event injection mechanism 532 may be triggered at the event points (e.g., a lower-fidelity version of Event A) shown in the scenario script 630. The manual event injection mechanism 534 allows the observer/instructor 12 to accelerate, delay, delete, or substitute injection of events during execution of the training exercise. However, the observer/instructor 12 may only substitute events designated by the scenario developer 13. In an aspect, the manual event injection mechanism 534 also allows the observer/instructor 12 to add events, designated as optional events by the scenario developer 13. However, addition of events may be limited to specific time blocks in the scenario script 630, or before or after a specified event. Execution of the exercise control module 530 may be facilitated through dashboard component 536.

Exercise performance monitor module 540 may operate in an automatic or semi-automatic mode. The exercise performance monitor module 540 may be implemented as a web application that provides planning and evaluation dashboard 541 to instructors 12. The module 540 may include front-end component 542, which may be a Python-based HTML5+ JavaScript application. Data for the front-end component 542 may be provided by software agent module 550. The module 540 may cause data and trainee progress toward learning objectives to be stored persistently for later review by observer/instructor 12. Finally, the module 540 may include evaluation tree mechanism 546 to cooperate with exercise evaluation tree mechanism 562 of exercise evaluation module 560.

Software agent module 550 cooperates with module 540 to provide data for front-end component 542 by virtual and physical agent plugins 553 and 555, respectively. The agent plugins 553 and 555 may be controlled through an agent monitoring and injection control mechanism 552. The agent plugins 553 and 555 may follow a defined shared-library API 554, and may cover a wide range of potential monitoring activities.

The software agent module 550 provides the physical agent plugins 555 for monitoring external systems and components outside the virtual machines 440. The exercise evaluation module 560 interacts with physical agent plugins 555 outside of the exercise virtual machines 440. The software agent module 550 may use a split architecture agent control mechanism 556, where physical agent plugins 555 may be deployed to computers outside of the exercise network of virtual machines 440 and virtual agent plugins 553 may be deployed on the exercise virtual machines 440. Because the virtual, variable-fidelity cyber range system 400 may be strongly isolated from any external networks, the agent plugins 553 and 555 may be controlled by two agent controllers, both feeding information to the exercise evaluation module 560; virtual agent controller 557 handles virtual agent plugins 553 deployed on exercise virtual machines 440 and physical agent controller 558 handles physical agent plugins 555 deployed on external systems. Alternately, agent control may be effectuated by use of a secure bridge (network or software) 559 between the agent control mechanism 556 and the external network so that physical agent plugins may be deployed to external systems. In an aspect, data may be gathered from preinstalled agent plugins—either native or browser plugins—as well as instrumenting the browser and acquiring information via JavaScript capabilities.

Exercise evaluation module 560 provides mechanisms that may be used to evaluate a training exercise and a training program that includes multiple training programs. One such mechanism is an exercise evaluation tree mechanism 562 that executes to generate an evaluation tree based on the scenario script 630 (see FIG. 6B). Take, for example, a training scenario involving a DDoS attack implemented as a SYN flood attack, which is a diversion for an identity theft attack aimed at securing passwords, bank accounts, and social security numbers for a financial institution's customers. The exercise evaluation module 560 includes other mechanisms, such as software agent mechanism 564, to direct agents differently depending on whether the agent plugin is to be deployed internally or externally. The module 560 may use non-binary metrics including non-binary numerical information, such as the time taken to complete a particular task or the number of lines changed in a configuration file. The module 560 also may use ancillary data collected through ancillary data mechanism 566 alongside the task completion type measurements and compare the data to the exercise timeline. For example, the module 560 may the record rate of typing activity, continuously, and plot it on a timeline marked with indications as to when training exercise tasks were completed.

Exercise adaption module 570 includes mechanisms that allow for automatic or manual fidelity degradation. One such mechanism is a fidelity step-down script mechanism 572 that may be based on an exercise evaluation tree such as the exercise evaluation tree 700 of FIG. 7. The fidelity step-down script mechanism 572 may describe decision points in the scenario script 630 where one or more lower-fidelity alternatives may be deployed automatically or manually in place of the reference, higher-fidelity configuration. For example, in an exercise directed to defending a Web server from a denial of service attack, the reference high-fidelity exercise may have a large number of attackers from an apparent wide variety of IP subnets making Web requests, similar to a botnet-based distributed denial of service attack. The exercise metadata describes how the fidelity could be reduced by using a smaller number of attackers from a single subnet, using a single external attacker, or hosting the attack program on the Web server itself, for example.

The exercise reporting and scenario feedback module 580 includes reporting component 581 and scenario feedback component 585. The reporting component 581 cooperates with other modules of the program 500, including the training device module 590, to collect, format, store (in reports database 122 of data store 120), and display results of completed training exercises. The reporting component further provides a report template mechanism 582 that allows observer/instructor 12 to generate and distribute a report of one training exercise or a plurality of training exercises. The report template mechanism 582 includes default report template 583 and custom report template 584. The custom report template allows the observer/instructor to use a drag and drop operation whereby data field descriptors from the reports database 122 are selected by the operator/instructor 12 to generate a custom report. For example, the reports database 122 may include as data field descriptors, trainee_name and date_of_training_exercise, and the observer/instructor 12 may generate a custom report with just these two data field descriptors to list in the custom report, all trainees 11 and the date the trainees 11 completed any training exercise.

The scenario feedback component 585 provides automatic feedback mechanism 586 and manual feedback mechanism 588. The automatic feedback mechanism 586 may provide an automatic feedback statement 587 to the scenario developer 13 for each completed training exercise. In an aspect, the statement 587 may be provided only for training exercises that involved a fidelity step down or for a training exercise that was completed with a perfect or near perfect score. The former condition may indicate a training exercise whose indications were too obtuse; the later condition may indicate a training exercise that was not sufficiently realistic. The manual feedback mechanism 588 allows the scenario developer 13 to generate, in advance of a training exercise, a feedback statement 589 (which may be completed by a trainee 11 or an observer/instructor 12) that will provide the scenario developer 13 specific data from the completed training exercise.

The training device module 590 provides for distributing training devices 40T and 40F to remote media devices 41 communication component 593 that communicates with communications module 220 of the deployed training devices 40T and 40F. The training device module 590 further includes agent component 595 that cooperates with agent module 550 to provide external, physical agent plugins 555 to the training devices 40T.

Figure 7:
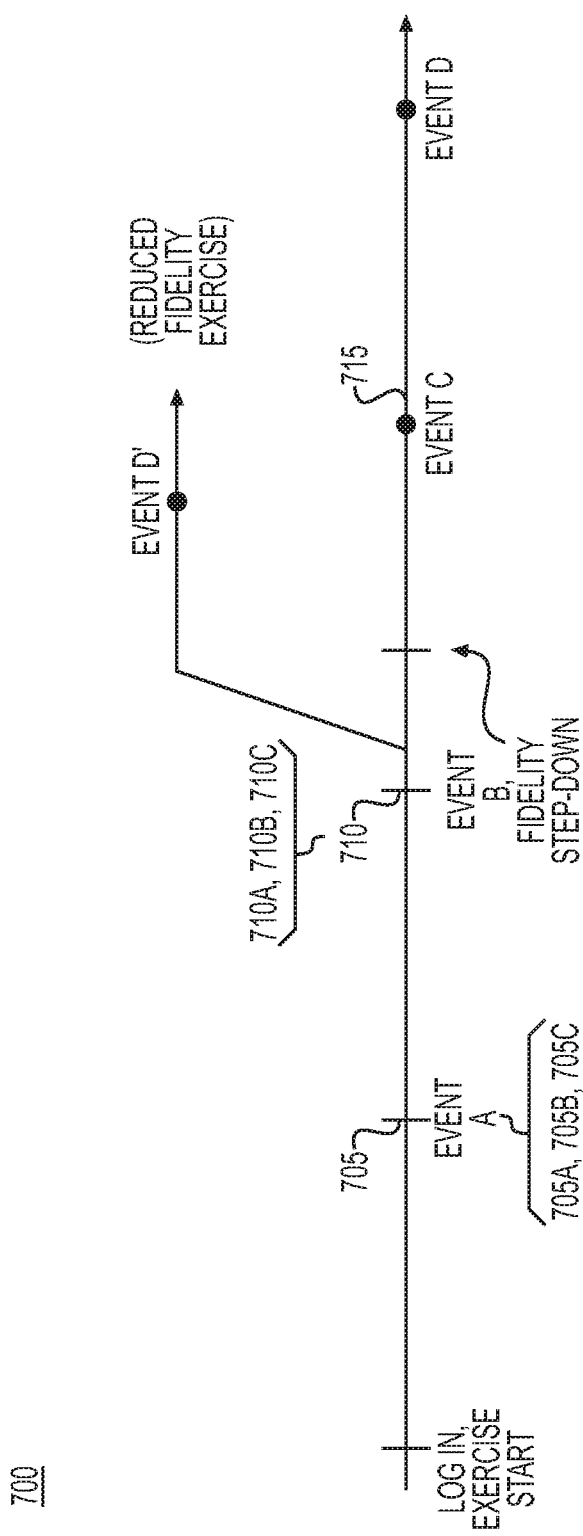

As noted above, exercise evaluation module 560 includes mechanisms that allow construction of an exercise evaluation tree. The exercise evaluation tree may be static and may represent the scenario developer's design for event injection, corresponding indications, and possible trainee actions and their outcomes. For the example training scenario involving a DDoS attack implemented as a SYN flood attack, which is a diversion for an identity theft attack aimed at securing passwords, bank accounts, and social security numbers for a financial institution's customers. FIG. 7 illustrates a segment of exercise evaluation tree 700, which begins with a botnet attack intended to slow down, (and optionally, eventually stop) network traffic into and out of the institution's internal computer network. A DDoS attack may be difficult to identify at least because an organization's Web site(s) may be down due to legitimate traffic, rather than an attack. One way to tell the difference lies in the length of time the HTTP service is down or sluggish—if slow or denied service continues for days rather than a spike during a campaign, a DDoS attack likely is underway. However, one cannot simply check to see if all of the traffic is coming from one IP, as this is the purpose of a DDoS: to have traffic coming from multiple sources. However, an organization may have implemented some technology upgrades that allow an IT person to know the network's normal behavior and may help point to any abnormal incidents such as a DDoS. The exercise evaluation tree 700 is based on the example virtual network 602 of FIG. 6A. The exercise evaluation tree 700 begins at inception of the training exercise with attack initiation and with the virtual network 602 at state 0. At 705 Event A is injected—an increase in resource demand on server 613 which may be manifested in HTTP server logs. In response, the trainee 11 can do nothing (705A), relax FW bandwidth limits (705B), or take initial actions to counter a possible DDoS or DoS attack including, maintaining bandwidth rules, monitoring bandwidth trends, notifying the organization's CITO, and identifying IP address and geographical locations of sending platforms, where possible (705C). Because 705C is the correct action, the trainee 11 is given a good grade, and the state of the virtual network 602 remains as at its initial state, since no changes were made. If the trainee 11 chooses 705B, the state of the virtual network 602 changes to state 1, with the gateway 604 capable of accommodating more traffic than at state 0. Note that since the attack is a sub-saturating DDoS attack, the attackers want to keep some network traffic possible so that the hacker may steal identity information through the gateway, but want enough of an increase to alert IT personnel that a DDoS attack is underway. If the trainee 11 does nothing (705A), the fidelity model ultimately may step down in fidelity and automatically adjust to increase the rate at which the botnet attack occurs. After 705(A), 705B or 705C, with the virtual network 602 at state 1 or state 0, respectively, the exercise evaluation tree 700 moves to 710, and the botnet attack increases, indicated by loss of HTTP service (Event B) on one of the servers 613. In response, the trainee 11 may do nothing (710A), may restrict access of certain IP addresses (710B), or may increase the queue of half-open connections (i.e., in the SYN-RCVD state), decrease the time for keeping a pending connection in the SYN-RCVD state, and take action to identify and block specific IP addresses (710C). Assuming the trainee 11 takes the action 710C, the exercise evaluation tree 700 moves to 715 and the trainee 11 is presented with an indication of an attempted hack and theft of data from the servers 613. Thus, the exercise evaluation tree 700 may progress through a number of interjections, responses (good or bad), state changes, and fidelity decision points. As noted, the decision points, when reached, may generate an automatic fidelity step down; in an aspect, the observer/instructor 12 may override the fidelity decision points, or may invoke a fidelity decision point at an earlier point in time.

In an example, the program 500 executes to create a variable-fidelity training scenario. In an aspect, the program 500 further executes to adapt the fidelity of a training exercise corresponding the variable fidelity training scenario. In one aspect, the fidelity of the training exercise in increased; in another aspect, the fidelity of the training exercise is decreased. Decreasing or increasing the fidelity of the training exercise may be executed based on actions taken during execution of the training exercise. Decreasing or increasing the fidelity of the training exercise also may be executed based on availability of computer resources used to support the training exercise. For example, a lower-fidelity training exercise may be used to invoke multiple software services on a single computing platform in order to reduce the number of virtual machines needed to support the training exercise, thereby maximizing training effectiveness under resource constraints.

Figure 8A:
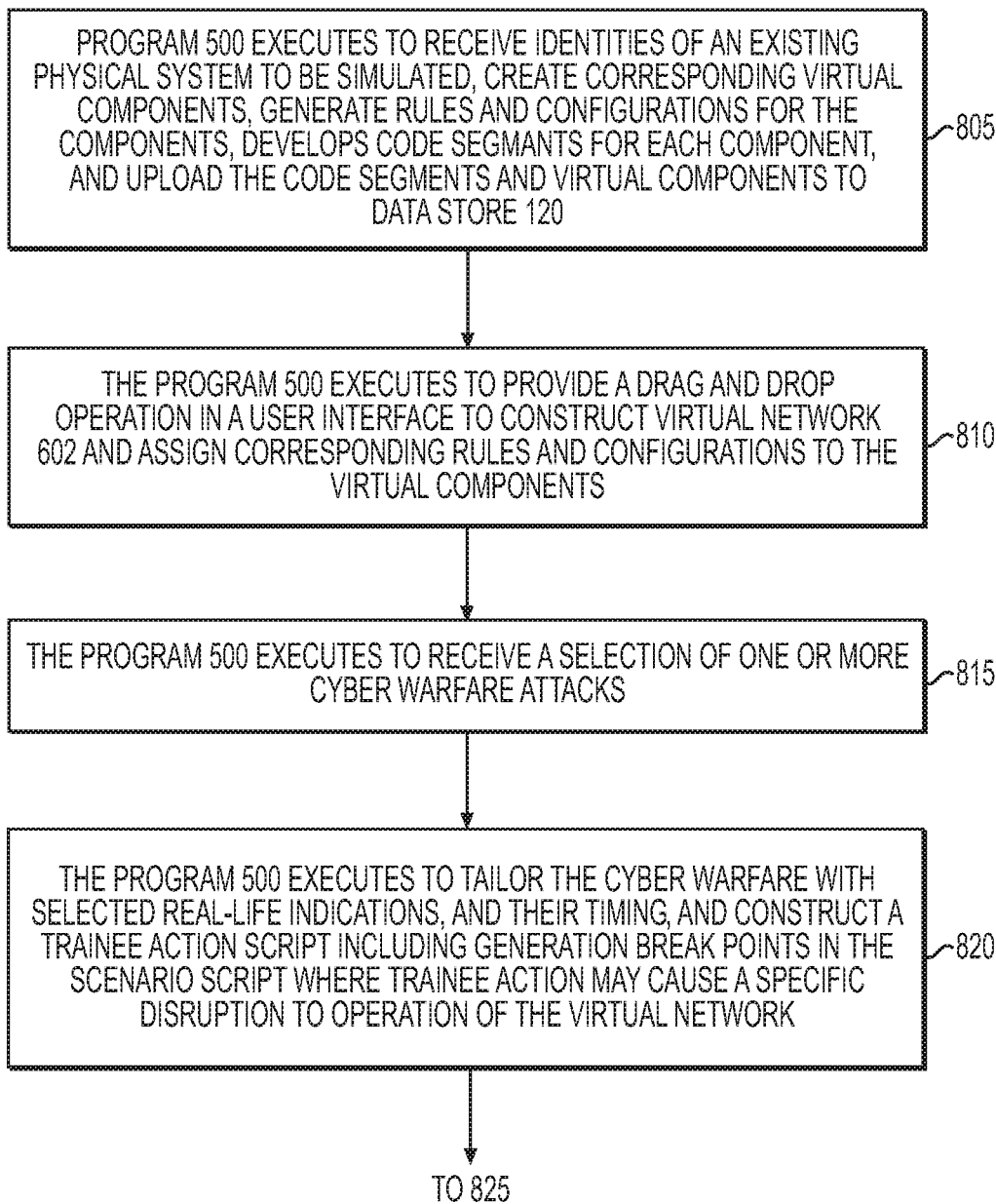
FIGS. 8A-10 illustrate example methods for evaluating and optimizing training effectiveness.
Figure 8B:
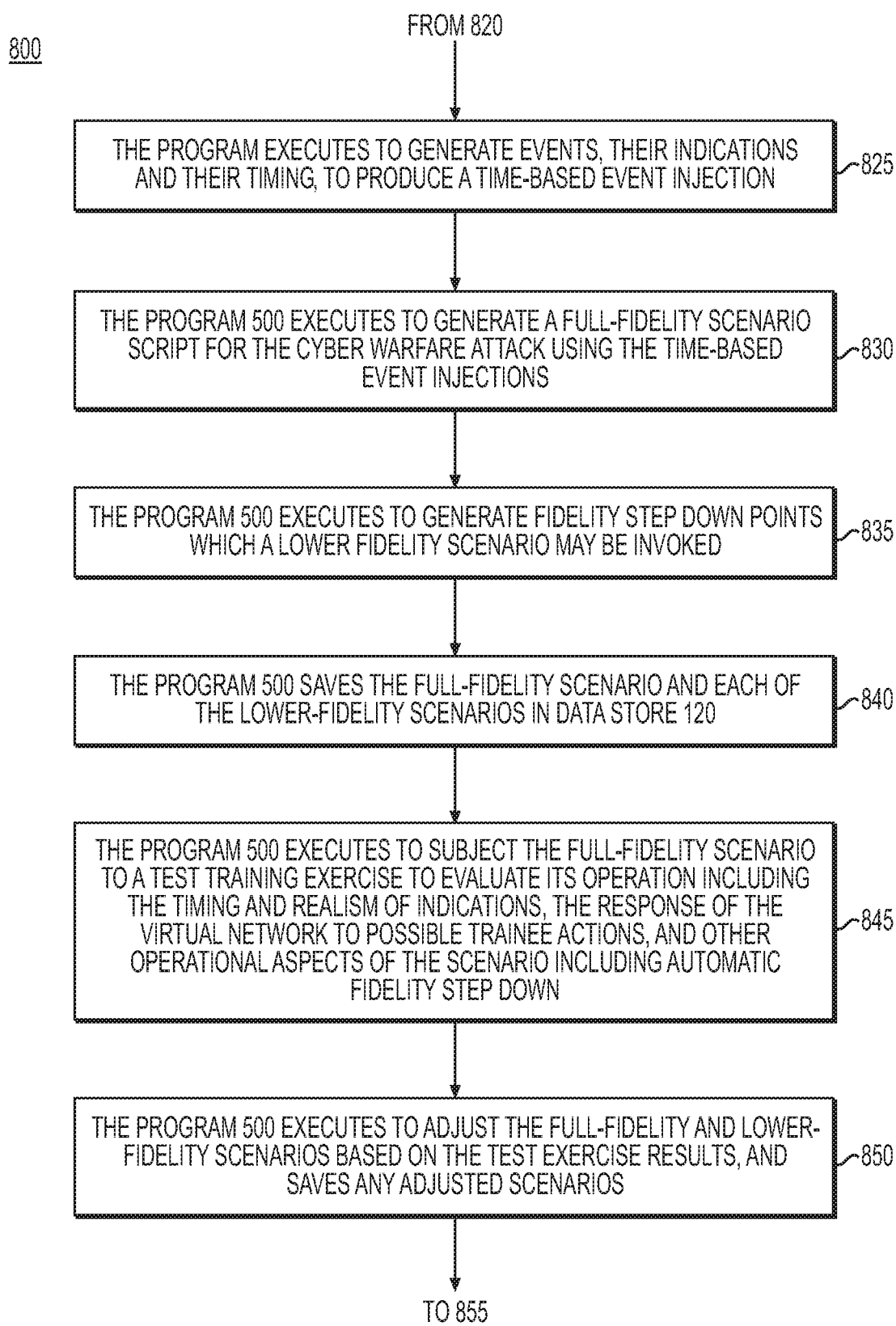
Figure 8C:
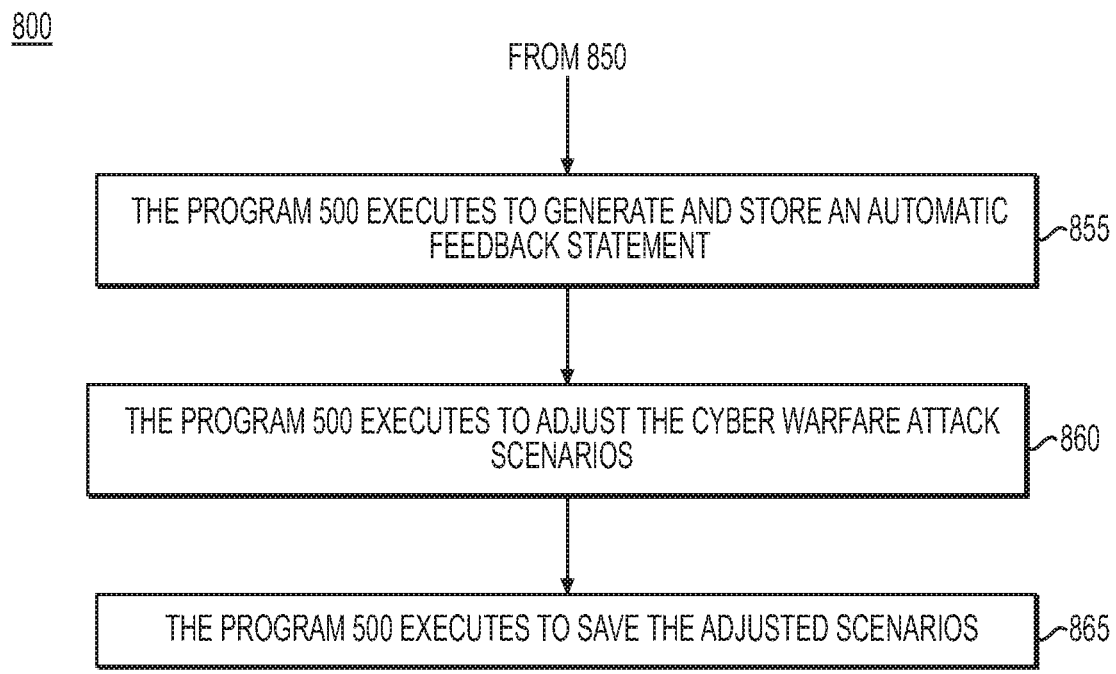

FIGS. 8A-10 illustrate example methods for evaluating and optimizing training effectiveness. The example methods are based on the virtual, variable-fidelity cyber range system 400 of FIG. 4, the program 500 of FIG. 5A, and the example SYN flood attack. In FIGS. 8A-8C, operation 800 begins in block 805 when the program 500 executes to identify components and structures of an existing physical system or network to be simulated, create corresponding virtual components and structures and generate rules and configurations for the components and structures, develop code segments for each component, structure, rule and configuration, and upload the code segments to virtual network database 124 of data store 120. Alternately, the program 500 may execute to use an existing virtual network in virtual network database 124. In another alternative, the virtual network may be a hypothetical virtual network stored in virtual network database 124. In block 810, the program 500 executes to provide a drag and drop operation in the user interface 600 to construct virtual network 602 and assign corresponding rules and configurations to the components of the virtual network 602. In block 815, the program 500 executes to provide a selection of one or more cyber warfare attacks from a list of possible attacks contained in challenges database 126 of data store 120. The selected attacks include information related to the attacking entity, including aspects of its configuration, and the scenario developer adds the information to the virtual network 602. For example, the SYN flood attack may require a botnet, and the scenario developer adds a botnet to the virtual network 602. In block 820, the program 500 executes to provide a tailored SYN flood attack through use of selected real-life indications, and their timing, as they would appear to an operator of an actual network corresponding to the LAN 606. As part of block 820, the program 500 executes to construct a trainee action script including best, good and no actions that a trainee 11 may take in response to the event indications, may refine future events and their indications in view of the trainee's possible actions, and may, where appropriate, generate break points in the scenario script where trainee action may cause a specific disruption to operation of the LAN 606. For example, should a trainee 11 take no action in response to a HTTP server halt, the virtual network 602 may not be vulnerable to a hack since all TCP traffic is blocked. In block 825, the program 500 executes to identify and change the events, their indications and their timing, to produce a time-based event injection. For example, the program 500 may execute to change the speed with which the SYN flood attack initially propagates through the LAN 606. In block 830, the program 500 executes to generate a full-fidelity scenario script for the SYN flood attack of the LAN 606 using the time-based event injections.

The operation 800 continues in block 835 with the program 500 executing to provide in the full-fidelity scenario script, fidelity step down points or conditions at which a lower fidelity scenario may be desired and appropriate, and generates one or more lower fidelity scenarios for possible implementation. In an aspect, the program 500 may execute to may make the fidelity step down automatic by generating coding to be implemented at the step-down points that executes to apply the trainee's actions to a step-down algorithm. In generating the lower fidelity scenarios, the program 500 executes to select a less complex version of a SYN flood attack, and/or may apply more demonstrative indications of such an attack. In block 840, the program 500 executes to save the full-fidelity scenario and each of the lower-fidelity scenarios in scenario database 128.

The operation 800 continues in block 845 when the program 500 executes to subject the full-fidelity scenario to a test training exercise to evaluate its operation including the timing and realism of indications, the response of the virtual network to possible trainee actions, and other operational aspects of the scenario including automatic fidelity step down. Similarly, the program 500 executes to subject each reduced-fidelity scenario to a similar test exercise sequence. In block 850, the program 500 executes to adjust, as necessary, the full-fidelity and lower-fidelity scenarios based on the test exercise results, and save any adjusted scenarios in scenario database 128.

The operation 800 continues in block 855 where, following execution of a training exercise corresponding to a scenario, the program 500 executes to generate an automatic feedback statement 587 and store the statement in the scenario database 128 with the corresponding scenario, and/or, receive from an observer/instructor 12, or trainee 11, a feedback statement 589. In block 860, the program 500 executes to adjust the scenario, as appropriate, based on the automatic and/or manual feedback. In block 865, the program 500 executes to save the adjusted scenarios in the scenario database 128. The operation 800 then ends.

Figure 9A:
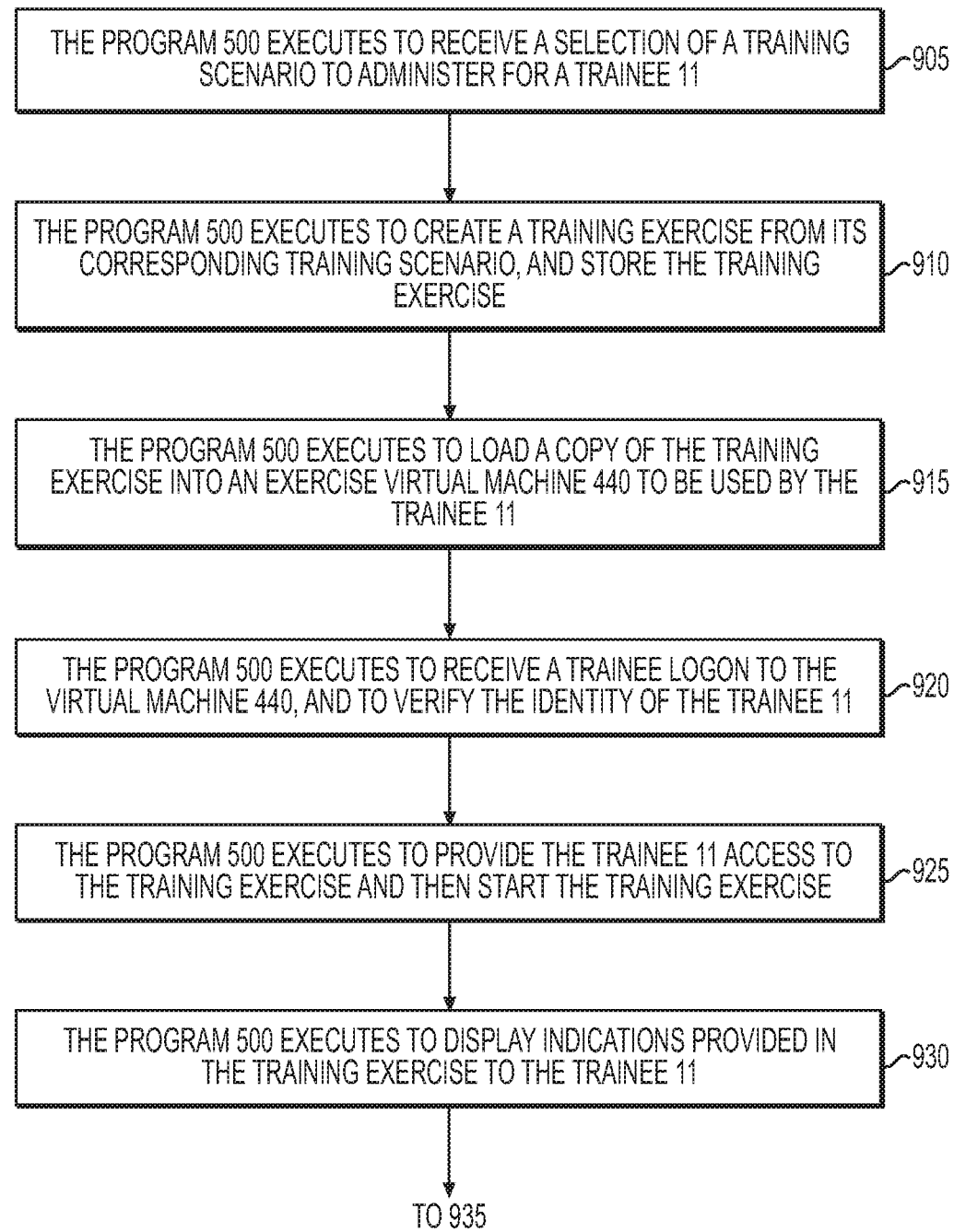
Figure 9B:
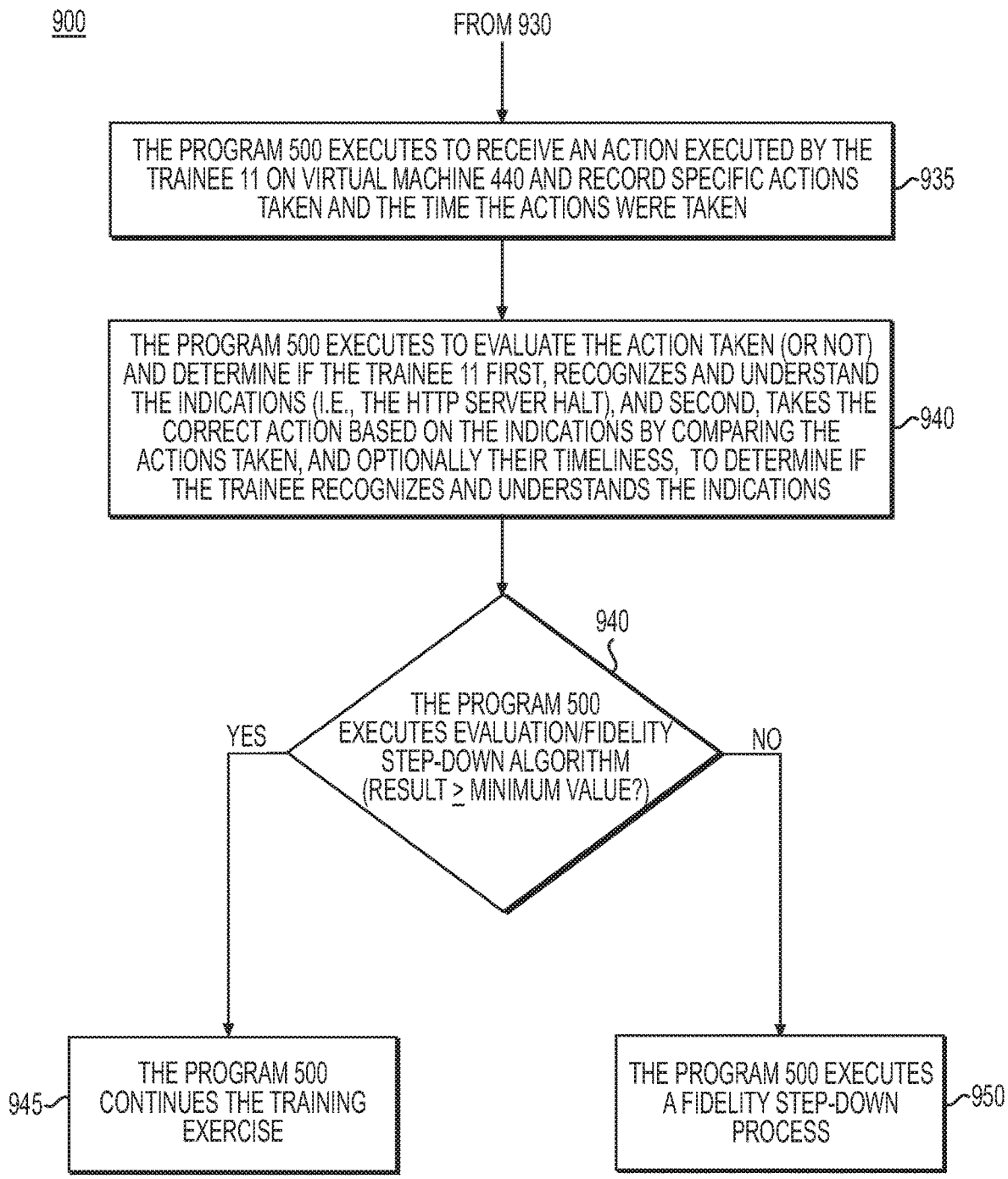

FIGS. 9A and 9B illustrate a flowchart of example training exercise operation 900. The operation 900 begins in block 905 when the program 500 executes to receive a selection of a training scenario to administer for a trainee 11. The observer/instructor 12 may select a full-fidelity version of the training exercise or a reduced-fidelity version of the training exercise. In block 910, the program 500 executes to create a desired training exercise from its corresponding training scenario, and store the training exercise in training exercise database 123 of data store 120. In block 915, the program 500 executes to load a copy of the training exercise from the database 123 to the exercise virtual machine 440 to be used by the trainee 11. In block 920, the program 500 executes to receive a trainee logon to the virtual machine 440, and to verify the identity of the trainee 11. In block 925, the program 500 executes to provide trainee 11 access to the training exercise and then start the training exercise.

The operation 900 continues in block 930, where the program 500 executes to display indications provided in the training exercise to the trainee 11. The training exercise may provide a blank screen at the beginning of the training exercise. However, depending on the training exercise, the SYN flood attack indications may begin immediately, but may not be visible to the trainee 11 or may be of such a nature that the trainee 11 may not be aware of the indications. For the example SYN flood training exercise, the HTTP server log may show an increasing number of half open connections that remain open until their time to live (TTL) point, at which time the connections are deleted from the backlog queue. However, the trainee 11 would only know this by consulting the HTTP server log, which may not happen. However, an increasing number of lengthy half-open connections is not necessarily an indication of a SYN flood attack, so even if the trainee 11 were to check the log, the trainee 11 ordinarily would not be expected to take any additional action other than continue monitoring the HTTP server log. In the example SYN flood attack, the first blatant indication of an anomaly may be a HTTP server halt, which occurs as injectable Event B in the scenario script 630. However, the HTTP server halt would obviously be preceded by other, more subtle indications of a SYN flood attack; Event A may be such an event—an increase in half-open connections or an increase in bandwidth demand. In block 935, the program 500 executes to receive an action executed by the trainee 11 on virtual machine 440. The action may come at any point before or after event A, and some actions would be expected no later than shortly after the indications provided with injection of event A. For example, if the trainee 11 reviews the HTTP server logs before any reason to do so is presented by way of a SYN flood indication, the action may be recorded in database 123, but the trainee 11 may not be given a credit for this action, since it is apparently a random action. However, after event A, the trainee 11 is expected to recognize the event and take one or more expected actions or sets of expected actions. In any case, the program 500 records specific actions taken, the time the actions were taken, and provides the actions to the program 500. After Event A, the training exercise moves to Event B, a HTTP server halt, after which the trainee 11 may take no action, take minimal actions, or incorrect actions, or may take most or all best actions. In block 940, following Event B, the program 500 evaluates the action taken (or not) and determines if the trainee 11 first, recognizes and understand the indications (i.e., the HPPT server halt), and second, takes the correct action based on the indications. In an aspect, the program 500 compares the actions taken, and optionally their timeliness, to determine if the trainee recognizes and understands the indications. If the scenario developer 13 designates Event B as an automatic fidelity step-down point, the consequences of the trainee's actions may be to continue with the original training action or to step down to a lower fidelity training exercise. Consequently, in block 940, the program 500 executes an action evaluation/ fidelity step-down algorithm, which is described in more detail with respect to FIG. 10. Following block 940, the operation 900 moves to block 945, if the trainee's actions are correct and consistent with Event B and to block 950 if the trainee's actions are not correct and inconsistent with Event B. In block 945, the operation 900 continues to block 955 with additional events C and D. In block 950, the program 500 executes a fidelity step down to a lower fidelity training exercise.

Figure 10:
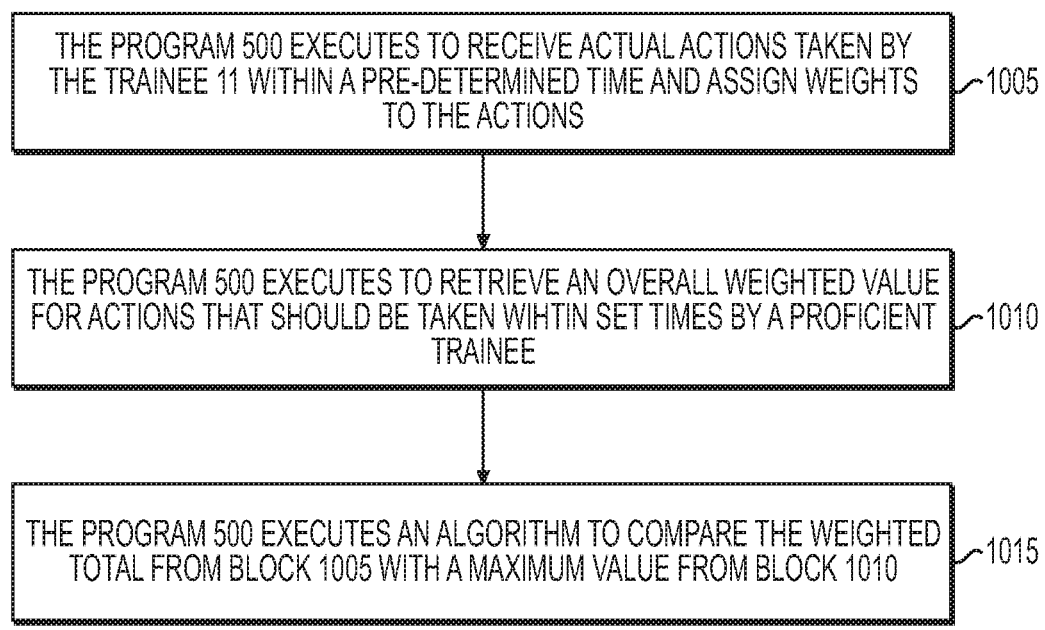

FIG. 10 illustrates an action evaluation/fidelity step-down operation of block 940. In FIG. 10, operation 1000 begins in block 1005 where the program 500 executes to receive actual actions taken by the trainee 11 within a pre-determined time. Each action taken within the pre-determined time may be assigned a weight equal to or greater than 1.0. In addition, certain actions may be assigned an increased weight (beyond that based on timing only) depending on the importance of the action. The pre-determined time may be set based on expected actions of a proficient trainee in the same situation. Actions taken past the predetermined time may be disregarded, or may be assigned a weight least than 1.0. In block 1010, the program 500 executes the algorithm to retrieve an overall weighted value for actions that should be taken within set times by a proficient trainee, considering the complexity of the action and the time to complete the action. In block 1015, the program 500 executes the algorithm to compare the weighted total from block 1005 with the maximum value from block 1010. If the block 1005 value is less than a specified percentage of the block 1010 value, the trainee's actions are incorrect and inconsistent and operation 900 moves to block 950. Otherwise, the operation 900 moves to block 945. Following block 1015, the operation 1000 ends.

Figure 11:
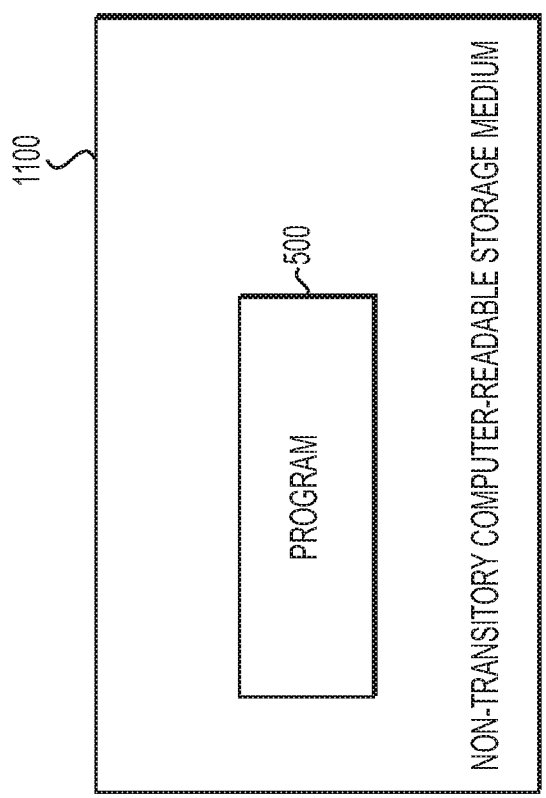
FIG. 11 illustrates a product encompassing a program for evaluating and optimizing training effectiveness.

FIG. 11 illustrates a product encompassing program 500 and its potential use in a training environment. In FIG. 11, program 500 is stored on non-transitory, computer-readable storage medium 1100. The storage medium 1100 may be provided to organizations and individuals, and may be used to generate a variable-fidelity virtual cyber range with associated virtual machines, such as the virtual, variable-fidelity cyber range system 400 of FIG. 4.

Certain of the devices shown in FIGS. 1A-5G include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flowchart and accompanying description to illustrate the examples represented in FIGS. 8A-10. The disclosed devices, components, and systems contemplate using or implementing any suitable technique for performing the steps illustrated. Thus, FIGS. 8A-10 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A method for improving a training program efficiency, the training program executed as one or more training exercises, a training exercise following a variable-fidelity training scenario, comprising:

a processor generating a virtual network on physical machines operated by trainees, on which is executed the training exercise, and the processor monitoring and controlling an execution of the training exercise;

the processor determining a training program effectiveness measure, comprising:

the processor determining a level of trainee performance of a trainee and determining a trainee skill improvement demonstrated during the execution of the training exercise, comprising:

determining a correctness and a timeliness of trainee actions during the training exercise and assigning a score to the trainee actions, comprising:

deploying and controlling, through a virtual agent controller, virtual software agents in the virtual network and in the virtual machines, controlling, through a physical agent controller, physical agent plugins in an external network outside the virtual network and outside the virtual machines, receiving from the virtual software agents, sensor data collected by virtual sensors implemented on the virtual machines and in the virtual network; and receiving from the physical agent plugins, physical sensor data comprising perceptual data of the trainee during execution of the training exercise, and evaluating the sensor data received from the virtual sensors and the physical agent plugins;

adapting, in real time, a training exercise fidelity during the training exercise, comprising adjusting the training exercise fidelity at fidelity adaptation points in the training exercise based on an evaluation of the sensor data;

retrieving an overall weighted value for actions that should be taken within set times by a proficient trainee;

executing an evaluation/fidelity algorithm to compare the score to the overall weighted value;

identifying and valuing trainee behaviors during the training exercise; and determining the trainee skill improvement based on the trainee actions, fidelity adaptations, and trainee behaviors;

the processor determining a training program cost measure, comprising:

determining a first monetary cost for the execution of the training exercise, determining trainee manhours for the execution of the training exercise and converting the trainee manhours to a second monetary cost, and generating the training program cost measure based on the first and second monetary costs;

the processor determining a ratio of the training program effectiveness measure to the training program cost measure exceeds a threshold value; and the processor identifying training exercise modifications that improve the training program efficiency.

2. The method of claim 1, wherein the training exercise comprises original training events, each original training event comprising expected trainee actions and trainee action requirements, and further comprises a training exercise complexity, and wherein the modifications comprise:

adding additional training events and corresponding trainee action requirements to the training exercise;

increasing a stringency of trainee action requirements for the original training events of the training exercise;

making the original training events less pronounced to the trainee; and increasing the training exercise complexity with a constant training exercise fidelity.

3. The method of claim 1, wherein the perceptual data are collected from one or more physical sensor plugins selected from a physical sensor group consisting of one or more cameras capable of capturing images or video, one or more microphones, a skin conductance sensor, an eye tracking sensor, and/or a heart rate sensor, and wherein determining training effectiveness further comprises the processor receiving and evaluating trainee profile data and environmental data collected during the execution of the training exercise.

4. The method of claim 1, wherein adapting the training exercise fidelity comprises the processor determining a decrease in the level of trainee performance and, in response, stepping down the training exercise fidelity.

5. The method of claim 1, wherein adapting the training exercise fidelity comprises the processor determining an increase in the level of trainee performance and, in response, increasing the training exercise fidelity.

6. The method of claim 5, wherein the training exercise comprises original training events, the method further comprising, in response to the increase in the level of trainee performance, the processor injecting additional events into the training exercise.

7. The method of claim 1, wherein during the execution of the training exercise, the processor provides indications of training exercise events, evaluates the trainee actions taken in response to the events, determines that the trainee recognizes and understands the indications; and takes a correct trainee action based on the indications, wherein the processor compares the trainee actions, and the timeliness of the trainee actions, to baseline values.

8. The method of claim 1, further comprising the processor applying the modifications to the variable-fidelity training scenario to generate a modified variable-fidelity training scenario.

9. The method of claim 1, wherein determining the training program cost measure further comprises determining a development cost to develop the training exercise, and an observer cost based on man hours required for a human observer of the training exercise.

10. A non-transitory, computer-readable storage medium having encoded thereon machine instructions for improving a training program efficiency, the training program executed as one or more training exercises, a training exercise following a variable-fidelity training scenario, wherein a processor executes the machine instructions to:

generate a virtual network, on physical machines operated by trainees, on which is executed the training exercise, and monitor and control an execution of the training exercise;

determine a training program effectiveness measure based on a level of trainee performance and on a trainee skill improvement demonstrated during the execution of the training exercise, wherein the processor:

determines a correctness and a timeliness of trainee actions during the training exercise and assigns a score to the trainee actions; wherein the processor:

deploys and controls, through a virtual agent controller, virtual software agents in the virtual network and in the virtual machines, controls, through a physical agent controller, physical agent plugins in an external network outside the virtual network and outside the virtual machines, receives from the virtual software agents, virtual sensor date collected by virtual sensors implemented on the virtual machines and in the virtual network, receives from the physical agent plugins, physical sensor data comprising perceptual data of the trainee during execution of the training exercise, and evaluates sensor data collected the virtual sensors and the physical agent plugins;

adapts a training exercise fidelity during the training exercise, wherein the processor: adjusts, in real time, the training exercise fidelity at fidelity adaptation points in the training exercise based on an evaluation of the sensor data;

retrieves an overall weighted value for actions that should be taken within set times by a proficient trainee;

executes an evaluation/fidelity algorithm to compare the score to the overall weighted value;

identifies and values trainee behaviors during the training exercise; and determines the trainee skill improvement as a weighted sum of the trainee actions, fidelity adaptations, and trainee behavior;

determine a training program cost measure, wherein the processor:

determines a first monetary cost for the execution of the training exercise, determines trainee manhours for the execution of the training exercise and converts the trainee manhours to a second monetary cost, and generates the training program cost measure based on the first and second monetary costs;

determines a ratio of the training program effectiveness measure to the training program cost measure exceeds a threshold value; and identify training exercise modifications that improve the training program efficiency.

11. The non-transitory, computer-readable storage medium of claim 10, wherein the training exercise comprises original training events, each original training event comprising expected trainee actions and trainee action requirements, and further comprises a training exercise complexity, and wherein the modifications comprise:

adding additional training events and corresponding trainee action requirements to the training exercise;

increasing a stringency of trainee action requirements for the original training events of the training exercise;

making the original training events less pronounced to the trainee; and increasing the training exercise complexity with a constant training exercise fidelity.

12. The non-transitory, computer-readable storage medium of claim 10, wherein adapting training fidelity comprises the processor determining a decrease in the level of trainee performance and, in response, stepping down the training exercise fidelity.

13. The non-transitory, computer-readable storage medium of claim 10, wherein the perceptual data are collected from one or more physical sensor plugins selected from a physical sensor group consisting of one or more cameras capable of capturing images or video, one or more microphones, a skin conductance sensor, an eye tracking sensor, and/or a heart rate sensor, and wherein determining training effectiveness further comprises the processor receiving and evaluating trainee profile data and environmental data collected during the execution of the training exercise.

14. The non-transitory, computer-readable storage medium of claim 10, further comprising the processor generating a training exercise evaluation statement and providing the statement to a training exercise developer.

15. A method for improving efficiency of a training program, comprising:

a processor generating a virtual network, on physical machines operated by trainees on which is executed a training exercise, and the processor monitoring an execution of a training exercise of the training program;

the processor determining a training program effectiveness measure, comprising:

the processor determining a trainee performance level and a trainee skill improvement demonstrated during the execution of the training exercise, comprising:

determining a correctness and a timeliness of trainee actions and in response adapting a training exercise fidelity during the execution of the training exercise, comprising:

deploying and controlling, through a virtual agent controller, virtual software agents in the virtual network and in the virtual machines, controlling, through a physical agent controller, physical agent plugins in an external network outside the virtual network and outside the virtual machines, receiving from the virtual software agents, sensor data collected by virtual sensors implemented on the virtual machines and in the virtual network, receiving from the physical agent plugins, physical sensor data comprising perceptual data of the trainee during execution of the training exercise, assigning a score to the trainee actions, retrieving an overall weighted value for actions that should be taken within set times by a proficient trainee, executing an evaluation/fidelity algorithm to compare the score to the overall weighted value, and evaluating the sensor data received from the virtual sensors and the physical agent plugins; and adjusting, in real time, the training exercise fidelity at fidelity adaptation points in the training exercise based on an evaluation of the sensor data;

the processor determining a training program cost measure, comprising:

determining a first monetary cost for the execution of the training exercise, determining trainee manhours for the execution of the training exercise and converting the trainee manhours to a second monetary cost, and generating the training program cost measure based on the first and second monetary costs; and the processor computing a ratio of the training program effectiveness measure to the training program cost measure.

16. The method of claim 15, wherein the processor determines the ratio exceeds a threshold value, wherein the processor identifies modifications to the training program to improve the training program efficiency.

17. The method of claim 16, wherein the training exercise comprises original training events, each original training event comprising expected trainee actions and trainee action requirements, and further comprises a training exercise complexity, and wherein the modifications comprise:
  adding additional training events and corresponding trainee action requirements to the training exercise;
  increasing a stringency of the trainee action requirements for the original training events of the training exercise;
  making the original training events less pronounced to the trainee; and
  increasing the training exercise complexity with a constant training exercise fidelity.

18. The method of claim 16, wherein the training exercise comprises original training events, each original training event comprising expected trainee actions and trainee action requirements, and further comprises a training exercise complexity, and wherein the modifications comprise:
  removing training events and corresponding trainee action requirements from the training exercise;
  decreasing a stringency of the trainee action requirements for the original training events of the training exercise;
  making the original training events more pronounced to the trainee; and
  decreasing the training exercise complexity with a constant training exercise fidelity.

19. The method of claim 16, wherein the modifications comprise:
  increasing a frequency of the execution of the training exercise;
  changing a length of time of the execution of the training exercise; and
  adding an additional training exercise to the training program.

20. The method of claim 16, wherein the modifications comprise placing the adaptations under manual control of a human observer of the training exercise.

21. The method of claim 20, wherein determining the trainee skill improvement comprises determining a percentage increase in trainee skill during the execution of the training exercise based on the trainee actions, fidelity adaptations, and trainee behaviors as determined by the processor and as observed by the human observer.

* * * * *